US012676519B2

(12) United States Patent
Ohsugi et al.

(10) Patent No.: US 12,676,519 B2
(45) Date of Patent: Jul. 7, 2026

(54) ROTOR CORE, ROTOR, AND ROTATING ELECTRICAL MACHINE

(71) Applicant: NIPPON STEEL CORPORATION, Tokyo (JP)

(72) Inventors: Yasuo Ohsugi, Tokyo (JP); Rei Honma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 230 days.

(21) Appl. No.: 18/552,918

(22) PCT Filed: Mar. 28, 2022

(86) PCT No.: PCT/JP2022/015203
§ 371 (c)(1),
(2) Date: Sep. 28, 2023

(87) PCT Pub. No.: WO2022/210610
PCT Pub. Date: Oct. 6, 2022

(65) Prior Publication Data
US 2024/0195241 A1     Jun. 13, 2024

(30) Foreign Application Priority Data
Mar. 31, 2021     (JP) ................................. 2021-060471

(51) Int. Cl.
H02K 1/276          (2022.01)
(52) U.S. Cl.
CPC ................................... H02K 1/276 (2013.01)
(58) Field of Classification Search
CPC ......... H02K 1/02; H02K 1/276; H02K 1/2766

USPC ...................................................... 310/156.56
See application file for complete search history.

(56) References Cited

U.S. PATENT DOCUMENTS

| | | | |
|---|---|---|---|
| 5,684,352 A * | 11/1997 | Mita | H02K 1/02 |
| | | | 310/152 |
| 7,795,772 B2 * | 9/2010 | Arimitsu | H02K 1/276 |
| | | | 310/156.56 |
| 8,890,385 B2 * | 11/2014 | Sano | H02K 1/2766 |
| | | | 310/156.53 |

(Continued)

FOREIGN PATENT DOCUMENTS

| | | | |
|---|---|---|---|
| JP | 2005130604 A * | 5/2005 | |
| JP | 2010-220359 A | 9/2010 | |

(Continued)

OTHER PUBLICATIONS

Translation of foreign document JP 2010220359 A (Year: 2010).*

*Primary Examiner* — Alex W Mok
(74) *Attorney, Agent, or Firm* — SOLARIS Intellectual Property Group, PLLC

(57)          ABSTRACT

A rotor core has plural holes including holes in which permanent magnets are installed, the rotor core including: a high permeability portion; and a low permeability portion having a relative permeability that is smaller than a relative permeability of the high permeability portion and that is greater than a relative permeability of a vacuum, wherein an entirety of an inner peripheral bridge portion, at least part of a region of which is disposed at an inner peripheral surface side of the rotor core relative to at least one of regions where the permanent magnets are installed, is the low permeability portion.

10 Claims, 13 Drawing Sheets

(56)                    References Cited

U.S. PATENT DOCUMENTS

| | | | | |
|---|---|---|---|---|
| 8,937,418 | B2 * | 1/2015 | Morishita | H02K 1/274 |
| | | | | 310/156.53 |
| 8,957,561 | B2 * | 2/2015 | Sano | H02K 1/2766 |
| | | | | 310/156.56 |
| 9,985,506 | B2 * | 5/2018 | Shibata | H02K 1/276 |
| 10,158,265 | B2 * | 12/2018 | Mochida | H02K 1/2746 |
| 10,411,535 | B2 * | 9/2019 | Takahashi | H02K 1/276 |
| 2008/0290753 | A1 * | 11/2008 | Arimitsu | H02K 1/246 |
| | | | | 310/156.36 |
| 2012/0200187 | A1 * | 8/2012 | Sano | H02K 1/2766 |
| | | | | 310/156.07 |
| 2019/0131837 | A1 * | 5/2019 | Miyaji | H02K 1/27 |
| 2019/0173336 | A1 * | 6/2019 | Takeuchi | H02K 1/246 |
| 2019/0222088 | A1 * | 7/2019 | Miyaji | H02K 1/274 |
| 2020/0083788 | A1 | 3/2020 | Zhu et al. | |
| 2020/0220437 | A1 | 7/2020 | Maki et al. | |

FOREIGN PATENT DOCUMENTS

| | | | |
|---|---|---|---|
| JP | 2019-213431 | A | 12/2019 |
| WO | 2019/065112 | A1 | 4/2019 |
| WO | 2019/066036 | A1 | 4/2019 |

* cited by examiner

ROTOR CORE, ROTOR, AND ROTATING ELECTRICAL MACHINE

TECHNICAL FIELD

The present disclosure relates to a rotor core, a rotor, and a rotating electrical machine.

BACKGROUND ART

In permanent magnet embedded types of rotating electrical machines, such as interior permanent magnet synchronous motors (IPMSMs), permanent magnets are embedded in a rotor core, and flux barriers are formed in the vicinities of the permanent magnets. The flux barriers are for controlling the flow of magnetic flux in the rotating electrical machine and improving the characteristics of the rotating electrical machine. When such flux barriers are formed, bridge portions are formed between two flux barriers and between the flux barriers and the end surface of the rotor core. If the bridge portions are configured by the soft magnetic body (e.g., electromagnetic steel sheets) configuring the rotor core, the magnetic flux generated by the permanent magnets may pass through the bridge portions and recirculate in the rotor core without proceeding to the stator core.

Thus, International Publication No. 2019/065112 describes providing, in the bridge portions, plural magneto-resistive portions that are spaced apart from each other at plural places in a suspension direction and whose permeability is made lower than that of other sites of the steel sheets.

SUMMARY OF INVENTION

Technical Problem

However, in the technology described in International Publication No. 2019/065112, the plural magneto-resistive portions are manufactured on the inner side of corner portions of the flux barriers sandwiching the magneto-resistive portions. Consequently, the magnetic flux more easily enters the bridge portions. Furthermore, in the technology described in International Publication No. 2019/065112, there is virtually no magnetic resistance in the regions of the bridge portions between the plural magneto-resistive portions. Consequently, the magnetic flux entering from one end of the bridge portions in the suspension direction may reach the other end via those regions. Thus, situations where the magnetic flux generated by the permanent magnets recirculates in the rotor core via the bridge portions without proceeding to the stator core may not be able to be reduced. For example, in a case where the regions between the plural magneto-resistive portions are short (e.g., in a case where the bridge portions are short), it becomes difficult to reduce the magnetic flux recirculating in the rotor core. Thus, the torque of the rotating electrical machine may not be able to be increased.

The present disclosure has been made in view of the problem described above, and it is an object thereof to increase the torque of a rotating electrical machine.

Solution to Problem

A rotor core of one aspect of the present disclosure has plural holes including holes in which permanent magnets are installed, the rotor core including: a high permeability portion; and a low permeability portion having a relative permeability that is smaller than a relative permeability of the high permeability portion and that is greater than a relative permeability of a vacuum, wherein an entirety of an inner peripheral bridge portion, at least part of a region of which is disposed at an inner peripheral surface side of the rotor core relative to at least one of regions where the permanent magnets are installed, is the low permeability portion.

A rotor core of another aspect of the present disclosure has plural holes including holes in which permanent magnets are installed, the rotor core including: a high permeability portion; and a low permeability portion whose relative permeability is smaller than the relative permeability of the high permeability portion and greater than the relative permeability of a vacuum, wherein part of a first outer peripheral bridge portion, which is disposed at a region configuring one pole of the rotor core and at a leading side in a rotational direction relative to a circumferential direction center of the region, and at least part of a region of which is disposed at an outer peripheral surface side of the rotor core relative to at least one of regions where the permanent magnets are installed, is the low permeability portion.

Advantageous Effects of Invention

According to the present disclosure, the torque of the rotating electrical machine can be increased.

BRIEF DESCRIPTION OF DRAWINGS

FIG. 5 is a view showing an example of configurations of inner peripheral bridge portions.

FIG. 12 is a view showing an example of configurations of first outer peripheral bridge portions and second outer peripheral bridge portions.

DESCRIPTION OF EMBODIMENTS

Embodiments of the present disclosure will be described below with reference to the drawings.

It will be noted that when objects of comparison, such as length, position, size, or spacing, are the same, this shall include cases where they are strictly the same and also cases where they differ without departing from the spirit of the present disclosure (e.g., where they differ in a tolerance range defined at the time of design). Furthermore, in each of the drawings, the x-y-z coordinates represent directional relationships in each of the drawings. In the x-y-z coordinates, the symbol comprising a circle with a black dot inside is a symbol representing that the direction heading from the far side of the page to the near side is a positive direction.

First Embodiment

First, a first embodiment will be described. In the present embodiment, a case where the rotating electrical machine is an IPMSM is described as an example.

Figure 1:
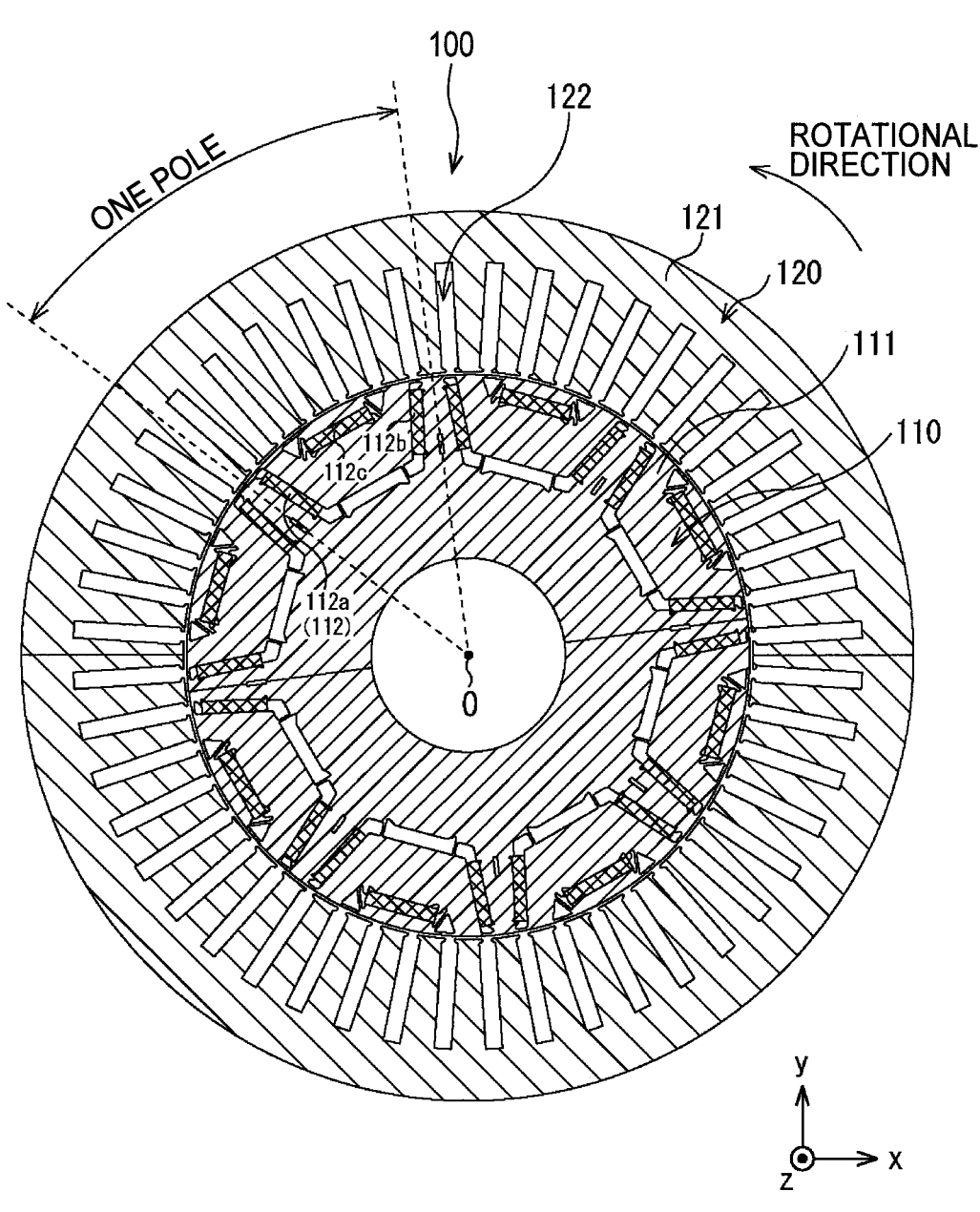
FIG. 1 is a view showing an example of the configuration of an IPMSM.

FIG. 1 is a view showing an example of the configuration of an IPMSM 100. FIG. 1 is a sectional view of the IPMSM 100 as cut perpendicular to a centerline 0 of the IPMSM 100 (a rotational axis of a rotor 110). In FIG. 1, the IPMSM 100 includes a rotor 110 and a stator 120.

The stator 120 includes a stator core 121 and stator coils (not shown in the drawings) and is for generating a rotating magnetic field. It will be noted that in FIG. 1 illustration of the stator coils with which the stator 120 is equipped is omitted because otherwise the notation would become complicated, but the stator coils are disposed at slots 122 of the stator core 121 (it will be noted that in FIG. 1 only one of the 48 slots is assigned a reference sign because otherwise the notation would become complicated).

Figure 2:
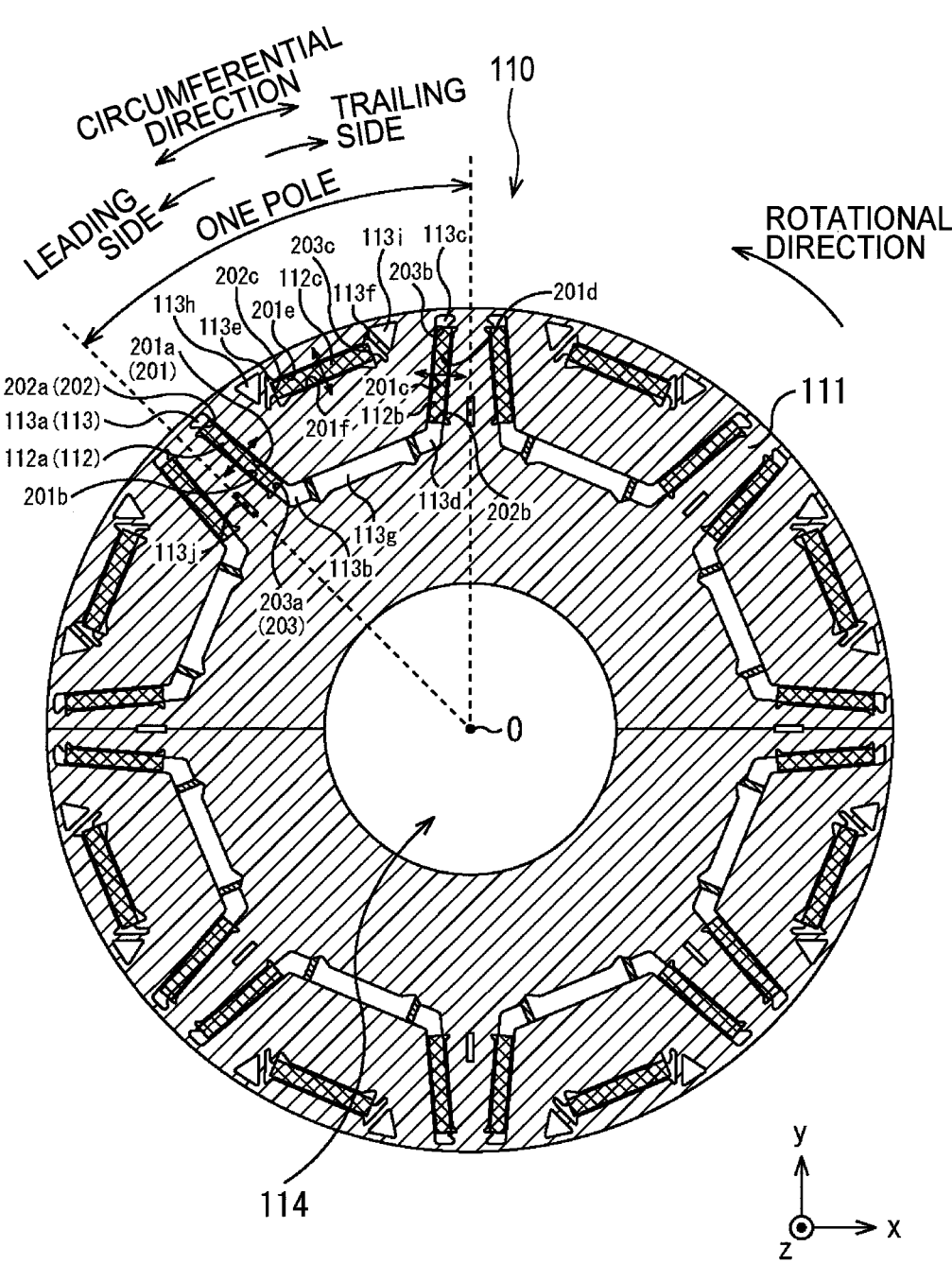
FIG. 2 is a view showing a first example of the configuration of a rotor and corresponds to a rotor of FIG. 1.

The rotor 110 rotates about a centerline 0 of the IPMSM 100 as a rotational axis. In the present embodiment, a case where the rotor 110 rotates in the direction of the arrowed line shown in FIG. 1 (i.e., the counterclockwise direction as one faces the page) is described as an example. However, in the present embodiment, the rotational direction of the rotor 110 is not limited to the direction of the arrowed line shown in FIG. 1. The rotor 110 may rotate in the opposite direction (i.e., the clockwise direction as one faces the page) of the direction of the arrowed line shown in FIG. 1 or may rotate in both the direction of the arrowed line shown in FIG. 1 and the opposite direction. FIG. 2 is a view showing an example of the configuration of the rotor 110. FIG. 2 also, like FIG. 1, is a sectional view of the rotor 110 as cut perpendicular to a centerline 0 of the rotor 110 (in the following description, the cross-section of the rotor 110 as cut perpendicular to the centerline 0 of the rotor 110 will also be called the rotor cross-section). It will be noted that the centerline 0 of the rotor 110 and the centerline 0 of the IPMSM 100 are coincident with each other.

As shown in FIG. 2, the rotor 110 includes a rotor core 111 and plural permanent magnets 112 (here, three permanent magnets 112a to 112c per pole). The rotor core 111 is configured using a soft magnetic material having a high permeability characteristic. The rotor core 111 is, for example, manufactured using plural electromagnetic steel sheets stacked along the centerline 0 of the rotor 110. However, it is not always necessary for the rotor core 111 to be configured using stacked plural electromagnetic steel sheets. The rotor core 111 may, for example, be a magnetic powder core, an amorphous core, and a nanocrystalline core. It will be noted that in a case where the rotor core 111 is a magnetic powder core, an amorphous core, or a nanocrystalline core, the soft magnetic material configuring the rotor core 111 is configured using insulation coated soft magnetic particles, an amorphous alloy, or a nanocrystalline alloy, respectively.

In the rotor core 111, plural holes are formed in a direction parallel to a centerline 0 of the rotor core 111 (hereinafter called the z-axis direction). In the present embodiment, a case where the holes are through holes running through the rotor core 111 in the z-axis direction is described as an example.

The plural permanent magnets 112 are each installed (in other words, embedded) in the rotor core 111 by being inserted into the holes formed in the rotor core 111. FIG. 2 shows as an example a case where magnetic flux flows in and out from pole faces 201 (201a to 201f) of the permanent magnets 112 (112a to 112c). The directions orthogonal to the pole faces 201 (the directions of the double-arrowed lines shown crossing the permanent magnets 112a to 112c in FIG. 2) are directions of magnetization of the permanent magnets 112. In the holes in which the permanent magnets 112 are installed, the regions where the permanent magnets 112 are not present serve as flux barriers 113 (113a to 113f). Furthermore, as for the holes in which the permanent magnets 112 are not installed, the entireties of those holes serve as flux barriers 113 (113g to 113j). There are no tangible objects present in the flux barriers 113, and the flux barriers 113 are air gaps (regions of air). The flux barriers 113 are regions through which the magnetic flux does not pass or through which it is more difficult for the magnetic flux to pass than the surrounding regions. However, the flux barriers 113 may also be configured by installing nonmagnetic bodies in them. Furthermore, in the rotor core 111, a hole 114 is manufactured in addition to the flux barriers 113. In the hole 114 is installed a shaft or the like (not shown in the drawings).

It will be noted that although in the present embodiment a case where the shape of the rotor cross-section has the shape shown in FIG. 2 in any position in the z-axis direction of the rotor 110 is described as an example, it is not always necessary for this to be the case.

Furthermore, FIG. 1 and FIG. 2 show as an example a case where the number of poles that the IPMSM 100 has is eight. In FIG. 1 and FIG. 2, the range of the double-arrowed line indicated as "one pole" is a portion that configures one pole of the IPMSM 100. Three permanent magnets 112a to 112c are embedded per pole, and a total of 24 permanent magnets are embedded in the rotor core 111. This number of poles and the number and arrangement of the permanent magnets 112 per pole are merely illustrative of an example and can be arbitrarily decided. In FIG. 1 and FIG. 2, only a portion configuring one pole of the rotor 110 is assigned reference signs, and reference signs for portions configuring the other seven poles of the rotor 110 are omitted, because otherwise the notation would become complicated. It will be noted that when the number of poles that the IPMSM 100 has is n-poles (where n is an integer equal to or greater than 2; in the example shown in FIG. 1 and FIG. 2, n=8), the IPMSM 100 generally has a relationship of rotational symmetry with n-number of symmetries about the centerline 0 of the IPMSM 100 as the axis of rotational symmetry.

Figure 3:
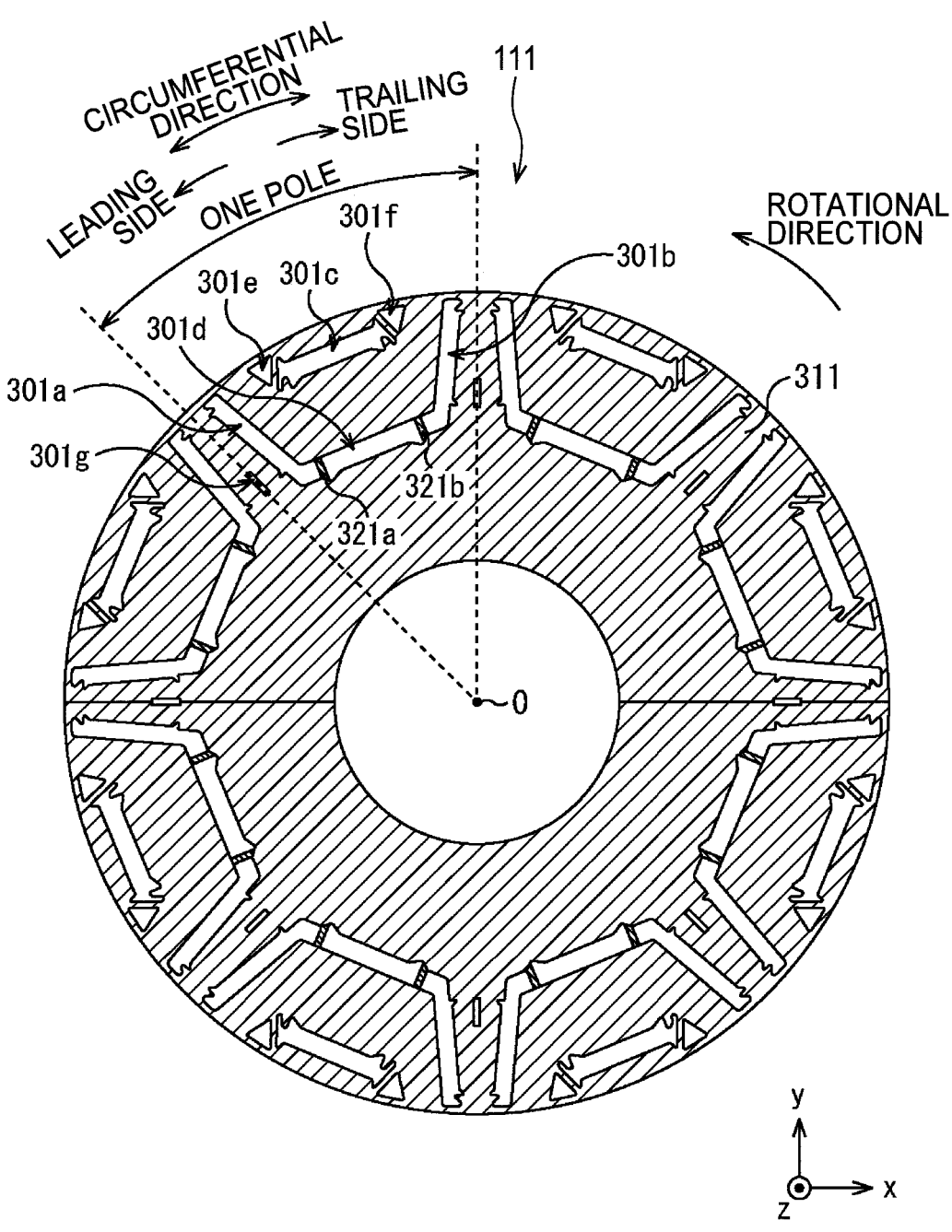
FIG. 3 is a view showing a first example of the configuration of a rotor core and corresponds to a rotor core of FIG. 2.
Figure 4:
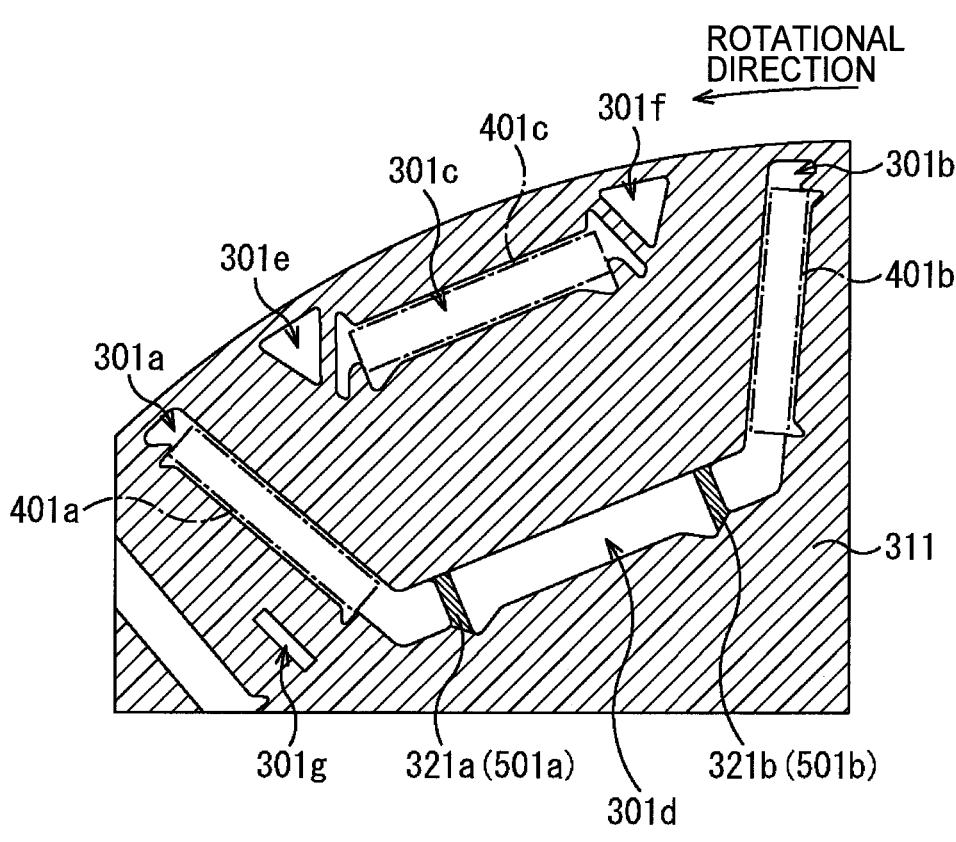
FIG. 4 is an enlarged view showing part of the rotor core shown in FIG. 3.
Figure 4:
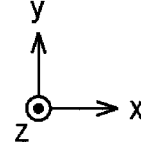

FIG. 3 is a view showing an example of the configuration of the rotor core 111. FIG. 4 is an enlarged view showing part of the rotor core 111 shown in FIG. 3. FIG. 3 also, like FIG. 1 and FIG. 2, is a sectional view of the rotor core 111 as cut perpendicular to the centerline 0 of the rotor core 111 (in the following description, the cross-section of the rotor core 111 as cut perpendicular to the centerline 0 of the rotor core 111 will also be called the rotor core cross-section). It will be noted that the centerline 0 of the rotor core 111 is coincident with the centerline 0 of the IPMSM 100 and the centerline 0 of the rotor 110. Furthermore, in FIG. 3 also, as in FIG. 2, only a portion configuring one pole of the rotor core 111 is assigned reference signs, and reference signs for portions configuring the other seven poles of the rotor core 111 are omitted.

In FIG. 3, the rotor core 111 includes holes 301*a* to 301*c* in which the permanent magnets 112 (112*a* to 112*c*) are installed and holes 301*d* to 301*g* in which the permanent magnets 112 are not installed.

The holes 301*a* to 301*b* in which the permanent magnets 112*a* to 112*b* are installed are disposed at such a way that the pole faces 201*a* to 201*d* (see FIG. 2) of the permanent magnets 112*a* to 112*b* installed in the holes 301*a* to 301*b* are inclined relative to the outer peripheral surface of the rotor core 111, which is the end surface of the rotor core 111 that opposes the stator 120. In other words, the pole faces 201*a* to 201*d* of the permanent magnets 112*a* to 112*b* are disposed so as to be inclined relative to the radial direction of the rotor core 111. FIG. 3 shows as an example a case where the holes 301*a* to 301*b* are manufactured in such a way that the circumferential direction spacing between the holes 301*a* to 301*b* in which the permanent magnets 112*a* to 112*b* are installed (the permanent magnets 112*a* to 112*b* installed in the holes 301*a* to 301*b*) becomes wider closer to the outer peripheral surface of the rotor core 111. In this way, FIG. 2 shows as an example a case where the permanent magnets 112*a* to 112*b* are arranged in what is called a V-shape (an inverted truncated chevron shape). By contrast, the hole 301*c* in which the permanent magnet 112*c* is installed is manufactured in such a way that the pole faces 201*e* to 201*f* (see FIG. 2) of the permanent magnet 112*c* installed in the hole 301*c* oppose the outer peripheral surface of the rotor core 111 via a high permeability portion 311 (in such a way as to have what is called a flat arrangement).

FIG. 1 shows as an example an inner rotor type of IPMSM 100. Consequently, as shown in FIG. 1, the outer peripheral surface of the rotor 110 (the rotor core 111) is the end surface that opposes the stator 120 across a gap.

Furthermore, in FIG. 2, side surfaces 202 (202*a* to 202*c*), 203 (203*a* to 203*c*) of the permanent magnets 112 (112*a* to 112*c*) are end surfaces positioned on end portion sides in a direction (hereinafter called the lengthwise direction) parallel to the pole faces 201 (201*a* to 201*f*) of the permanent magnets 112 (112*a* to 112*c*) (in the example shown in FIG. 2, end surfaces positioned on lengthwise direction end portions of the pole faces 201 (201*a* to 201*f*) of the permanent magnets 112 (112*a* to 112*c*)).

As described above, in the present embodiment, a case where three holes per pole are manufactured in the rotor core 111 as the holes 301*a* to 301*c* in which the permanent magnets 112*a* to 112*c* are installed is described as an example. However, the number of holes per pole in which the permanent magnets are installed may be more than three or two or less. For example, a permanent magnet may be installed in the hole 301*d*, and the permanent magnet 112*c* need not be installed in the hole 301*c*.

In FIG. 4, of the regions of the holes 301*a* to 301*c* in which the permanent magnets 112*a* to 112*c* are installed, regions other than regions 401*a* to 401*c* where the permanent magnets 112*a* to 112*c* are installed (i.e., the regions where the permanent magnets 112*a* to 112*c* are not installed) serve as the flux barriers 113*a* to 113*f* shown in FIG. 2. Furthermore, the entireties of the regions of the holes 301*d* to 301*g* in which permanent magnets are not installed serve as the flux barriers 113*g* to 113*j* shown in FIG. 2.

The rotor core 111 includes a high permeability portion 311 and low permeability portions 321*a* to 321*b* in regions apart from the holes 301*a* to 301*g*. The high permeability portion 311 is configured by the aforementioned soft magnetic material (e.g., electromagnetic steel sheets) having a high permeability characteristic and configuring the rotor core 111.

The relative permeability of the low permeability portions 321*a* to 321*b* is lower than the relative permeability of the high permeability portion 311 and higher than the relative permeability of a vacuum or air (~ 1) (the relative permeability of a vacuum or air < the relative permeability of the low permeability portions 321*a* to 321*b*< the relative permeability of the high permeability portion 311). It will be noted that in the present embodiment, as an example, the low permeability portions 321*a* to 321*b* and the high permeability portion 311 are integrally formed of the same material. Specifically, the high permeability portion 311 is a portion configured by the soft magnetic material (e.g., electromagnetic steel sheets) as mentioned above, and the low permeability portions 321*a* to 321*b* are portions where the permeability of the soft magnetic material has been lowered. In this way, the low permeability portions 321*a* to 321*b* and the high permeability portion 311 are integrally formed of the same material, whereby mechanical strength can be increased more than when a low permeability material (or a nonmagnetic material) different from that of the high permeability portion 311 is inserted into the low permeability portions 321*a* to 321*b* and bonded. It will be noted that methods of lowering the permeability of the soft magnetic material, that is, methods of manufacturing the low permeability portions 321*a* to 321*b*, are described below. Furthermore, the method of manufacturing the low permeability portions 321*a* to 321*b* is not particularly limited as long as the relative permeability of the low permeability portions 321*a* to 321*b* is smaller than the relative permeability of the high permeability portion.

For example, the permeability of parts (in the present embodiment, the low permeability portions 321*a* to 321*b*) of the region of the soft magnetic material (e.g., electromagnetic steel sheets) configuring the rotor core 111 may be lowered by pressing the regions configuring the low permeability portions 321*a* to 321*b* among the region of the soft magnetic material (e.g., electromagnetic steel sheets) configuring the rotor core 111 so that the thickness of the regions configuring the low permeability portions 321*a* to 321*b* is made thinner than the thickness of the region configuring the high permeability portion 311.

Furthermore, as described in JP-A No. 2011-114927, the thickness of the regions configuring the low permeability portions 321*a* to 321*b* among the region of the soft magnetic material (e.g., electromagnetic steel sheets) configuring the rotor core 111 may be made thinner by etching.

Furthermore, as described in JP-A No. 2001-93717, the permeability of parts of the region of the soft magnetic material (e.g., electromagnetic steel sheets) configuring the rotor core 111 may be lowered by applying a high-energy density beam, while adding a modified material, to the regions configuring the low permeability portions 321*a* to 321*b* among the region of the soft magnetic material (e.g., electromagnetic steel sheets) configuring the rotor core 111.

Furthermore, as described in JP-A No. H11-18324, the permeability of parts of the region of the soft magnetic material (e.g., electromagnetic steel sheets) configuring the rotor core 111 may be lowered by welding the regions configuring the low permeability portions 321*a* to 321*b* among the region of the soft magnetic material (e.g., electromagnetic steel sheet) configuring the rotor core 111 or causing distortions or transitions in those regions.

Furthermore, the low permeability portions 321*a* to 321*b* may also be manufactured without lowering the permeability of parts of the region of the soft magnetic material (e.g., electromagnetic steel sheets) configuring the rotor core 111. For example, as described in JP-A No. 2010-029514, the low permeability portions 321*a* to 321*b* may be manufactured by manufacturing holes (e.g., through holes) in the z-axis direction of the IPMSM 100 in the regions configuring the low permeability portions 321*a* to 321*b* among the region of the soft magnetic material (e.g., electromagnetic steel sheets) configuring the rotor core 111 and filling the holes with low permeability members.

Figure 5:
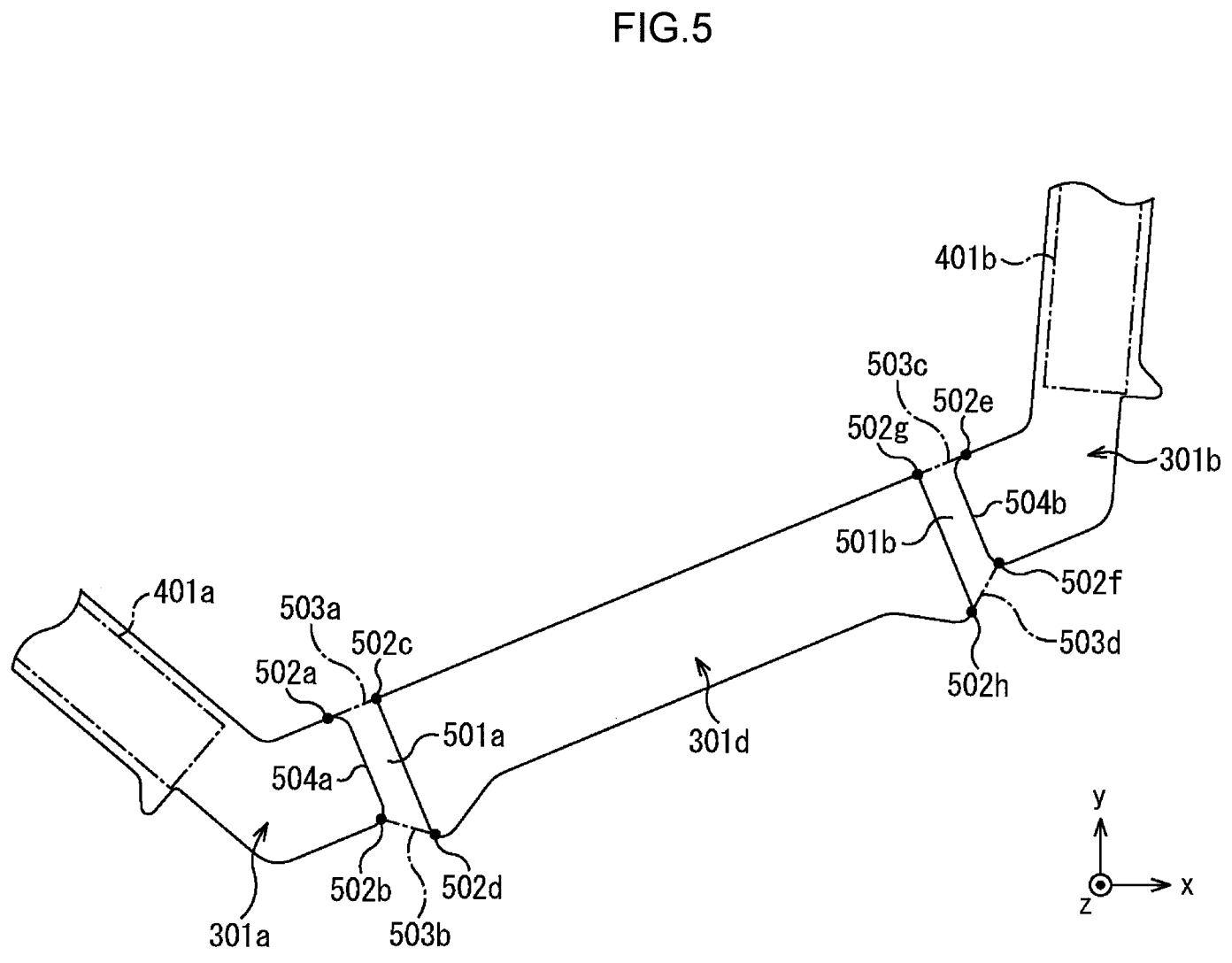

The low permeability portions 321*a* to 321*b* manufactured as described above are bridge portions disposed at entireties of inner peripheral bridge portions at least parts of which are disposed at the inner peripheral surface side of the rotor core 111 relative to at least one of the regions 401*a* to 401*c* where the permanent magnets 112*a* to 112*c* are installed. FIG. 5 is a view showing an example of the configuration of inner peripheral bridge portions 501*a* to 501*b*. It will be noted that illustration of the low permeability portions 321*a* to 321*b* is omitted in FIG. 5 because otherwise the notation would become complicated.

FIG. 3 to FIG. 5 show as an example a case where the inner peripheral bridge portions 501*a*, 501*b* are disposed between the holes 301*a*, 301*b* in which the permanent magnets 112*a*, 112*b* are installed and the hole 301*d* in which a permanent magnet is not installed. It will be noted that in the present specification "between a hole and a hole" means a region from a surface forming one hole to a surface configuring another hole, "between a hole and an end surface" means a region from a surface forming a hole to an end surface, and "between an end surface and an end surface" means a region from an end surface to an end surface. Furthermore, the inner peripheral bridge portions 501*a*, 501*b* are not limited to being disposed between the holes 301*a*, 301*b* in which the permanent magnets 112*a*, 112*b* are installed and the hole 301*d* in which a permanent magnet is not installed. The inner peripheral bridge portions may be sandwiched between two holes to thereby be disposed between the two holes. For example, the inner peripheral bridge portions may be sandwiched between two holes in which permanent magnets are installed to thereby be disposed between the two holes, or may be sandwiched between two holes in which permanent magnets are not installed to thereby be disposed between the two holes. Furthermore, the inner peripheral bridge portions 501*a*, 501*b* are not limited to a case where they are disposed between two holes (in the example shown in FIG. 3 to FIG. 5, the two holes 301*a*, 301*d* and the two holes 301*b*, 301*d*). For example, in a case where the distance between one hole (e.g., the hole 301*d*) manufactured in the rotor core 111 and the inner peripheral surface of the rotor core 111 is short and the region between that one hole and the inner peripheral surface of the rotor core 111 serves as a bridge portion, that bridge portion may serve as an inner peripheral bridge portion. In this way, the inner peripheral bridge portion may be disposed between one hole and the inner peripheral surface of the rotor core by being sandwiched between that hole and the inner peripheral surface of the rotor core.

As mentioned above, at least parts of the inner peripheral bridge portions 501*a* to 501*b* are disposed at the inner peripheral surface side of the rotor core 111 relative to at least one of the regions 401*a* to 401*c* where the permanent magnets 112*a* to 112*c* are installed. As mentioned above, in the present embodiment, the outer peripheral surface of the rotor 110 (the rotor core 111) is the end surface of the rotor core 111 that opposes the stator 120 across a gap. Consequently, the inner peripheral surface side (i.e., the centerline 0 side) of the rotor 110 (the rotor core 111) is on the opposite side of the end surface side of the rotor core 111 that opposes the stator 120. FIG. 5 shows as an example a case where, in each pole, at least parts of the inner peripheral bridge portions 501*a* to 501*b* are disposed at the inner peripheral surface side (the centerline 0 side) of the rotor 110 (the rotor core 111) relative to the regions 401*a* to 401*c* where the three permanent magnets 112*a* to 112*c* are installed. It will be noted that, as shown in FIG. 4, the regions 401*a* to 401*b* where the permanent magnets 112*a* to 112*b* are installed are disposed at the inner peripheral surface side (the centerline 0 side) of the rotor 110 (the rotor core 111) relative to the region 401*c* where the permanent magnet 112*c* is installed, so the entireties of the regions of the inner peripheral bridge portions 501*a* to 501*b* are disposed at the inner peripheral surface side (the centerline 0 side) of the rotor 110 (the rotor core 111) relative to the region 401*c* where the permanent magnet 112*c* is installed.

FIG. 5 shows as an example a case where the inner peripheral bridge portions 501*a* to 501*b* are disposed between end portions 504*a* to 504*b* on the side where the circumferential direction spacing between the regions 401*a* to 401*c* where the permanent magnets 112*a* to 112*c* are installed becomes shorter (i.e., end portions on the inner peripheral surface side of the rotor core 111) among the lengthwise direction end portions of the holes 301*a* to 301*b*.

The region of the inner peripheral bridge portion 501*a* will be more specifically described. The inner peripheral bridge portion 501*a* is a region which is defined by two lines interconnecting corner portions of the holes 301*a*, 301*d* sandwiching the inner peripheral bridge portion 501*a* (in other words, portions interconnecting sides forming the holes including portions serving as representative points described below in the rotor core cross-section) and the holes 301*a*, 301*d* in the rotor core cross-section and which is located between the holes 301*a*, 301*d*. As described below, the greater the ratio of the area of the low permeability portion in the inner peripheral bridge portion to the area of the inner peripheral bridge portion, the better. Thus, these two lines are, for example, straight lines interconnecting representative points of the corner portions selected from among regions forming the corner portions so that the straight lines do not pass through the insides of the holes 301*a*, 301*d* and so that the size of the inner peripheral bridge portion 501*a* is the largest.

For example, in a case where a corner portion appears as one vertex in the rotor core cross-section, that vertex is selected as the representative point of the corner portion.

However, in a case where the corner portions are not defined by one vertex, such as a case where the corner portions of the holes 301*a*, 301*d* have a curvature to them, the representative points of the corner portions of the holes 301*a*, 301*d* are selected from among the regions forming the corner portions of the holes 301*a*, 301*d*, such as the regions that have a curvature to them. The representative points of the corner portions are, for example, selected so that the size of the inner peripheral bridge portion 501*a* is the largest. However, it is not always necessary for the representative points of the corner portions to be selected in this way. For example, the center positions of the regions forming the corner portions may also be selected as the representative points of the corner portions.

In the example shown in FIG. 5, among the corner portions of the hole 301*a*, the two corner portions positioned on the end opposing the hole 301*d* each have a curvature to them, so points 502*a* to 502*b* are selected from the regions forming the corner portions of the hole 301*a* to be the representative points of the corner portions of the hole 301a. Furthermore, of the corner portions of the hole 301d, the two corner portions positioned on the end opposing the hole 301a also each have a curvature to them, so points 502c to 502d are selected from the regions forming the corner portions of the hole 301d to be the representative points of the corner portions of the hole 301d. Additionally, the region which is defined by a straight line 503a interconnecting the representative point 502a of the corner portion of the hole 301a and the representative point 502c of the corner portion of the hole 301d, a straight line 503b interconnecting the representative point 502b of the corner portion of the hole 301a and the representative point 502d of the corner portion of the hole 301d, and the holes 301a, 301d and which is located between the holes 301a, 301d is the inner peripheral bridge portion 501a.

Likewise, representative points 502e to 502f of the corner portions of the hole 301b and representative points 502g to 502h of the corner portions of the hole 301d are selected. Additionally, the region which is defined by a straight line 503c interconnecting the representative point 502e of the corner portion of the hole 301b and the representative point 502g of the corner portion of the hole 301d, a straight line 503d interconnecting the representative point 502f of the corner portion of the hole 301b and the representative point 502h of the corner portion of the hole 301d, and the holes 301b, 301d and which is located between the holes 301b, 301d is the inner peripheral bridge portion 501b.

In the present embodiment, the inner peripheral bridge portions 501a to 501b are defined as described above.

As mentioned above, the entireties of the inner peripheral bridge portions 501a to 501b are the low permeability portions 321a to 321b, so the inner peripheral bridge portions 501a to 501b shown in FIG. 5 and the low permeability portions 321a to 321b shown in FIG. 3 and FIG. 4 are coincident with each other. This is what is meant by the reference signs "321a (501a)", "321b (501b)" in FIG. 4.

As described above, a case where the rotor core 111 of the present embodiment includes the two inner peripheral bridge portions 501a to 501b per pole and where the entireties of the inner peripheral bridge portions 501a to 501b are the low permeability portions 321a to 321b is described as an example. However, the number of the inner peripheral bridge portions per pole may be more than two or may be one. For example, the hole 301d may be divided into two, the region between the two holes may each be configured to serve as an inner peripheral bridge portion, and the entirety of that inner peripheral bridge portion may be configured to serve as a low permeability portion. In a case where this is done, the inner peripheral bridge portion becomes disposed between two holes in which permanent magnets are not installed. Furthermore, the region between the holes 301a to 301b may be configured to serve as an inner peripheral bridge portion without the hole 301d being manufactured, and the entirety of that inner peripheral bridge portion may be configured to serve as a low permeability portion. In a case where this is done, the inner peripheral bridge portion becomes disposed between two holes in which permanent magnets are installed. Furthermore, in a case where this is done, it is preferred that the sizes and shapes of the holes 301a to 301b be changed so that the region between the holes 301a to 301b becomes narrower.

The present inventors found that by configuring the entireties of the inner peripheral bridge portions 501a to 501b to serve as the low permeability portions 321a to 321b, the torque of the rotating electrical machine increases more than by configuring only parts of the inner peripheral bridge portions 501a to 501b to serve as the low permeability portions. This will be described below. Here, a configuration where, as shown in FIG. 3 and FIG. 4, the entireties of the inner peripheral bridge portions 501a to 501b are configured to serve as the low permeability portions 321a to 321b will be called example 1 of the present disclosure.

Figure 6:
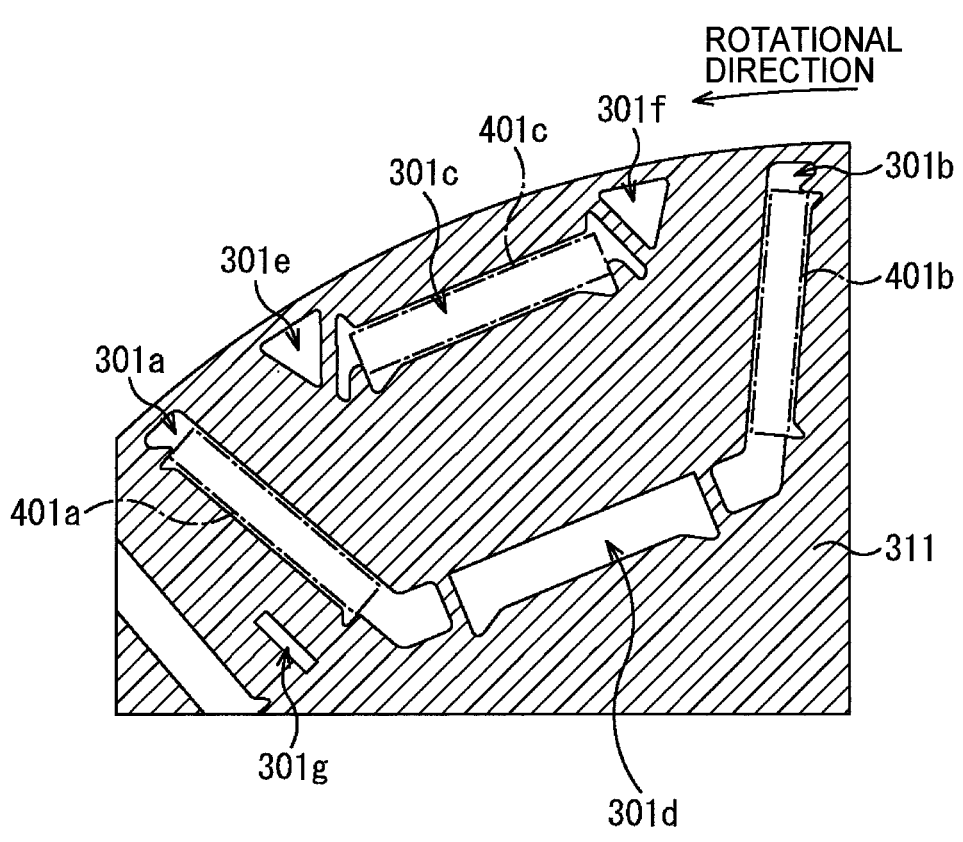
FIG. 6 is a view showing the configuration of comparative example 1 of a rotor core.
Figure 6:
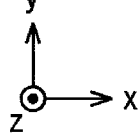
Figure 7:
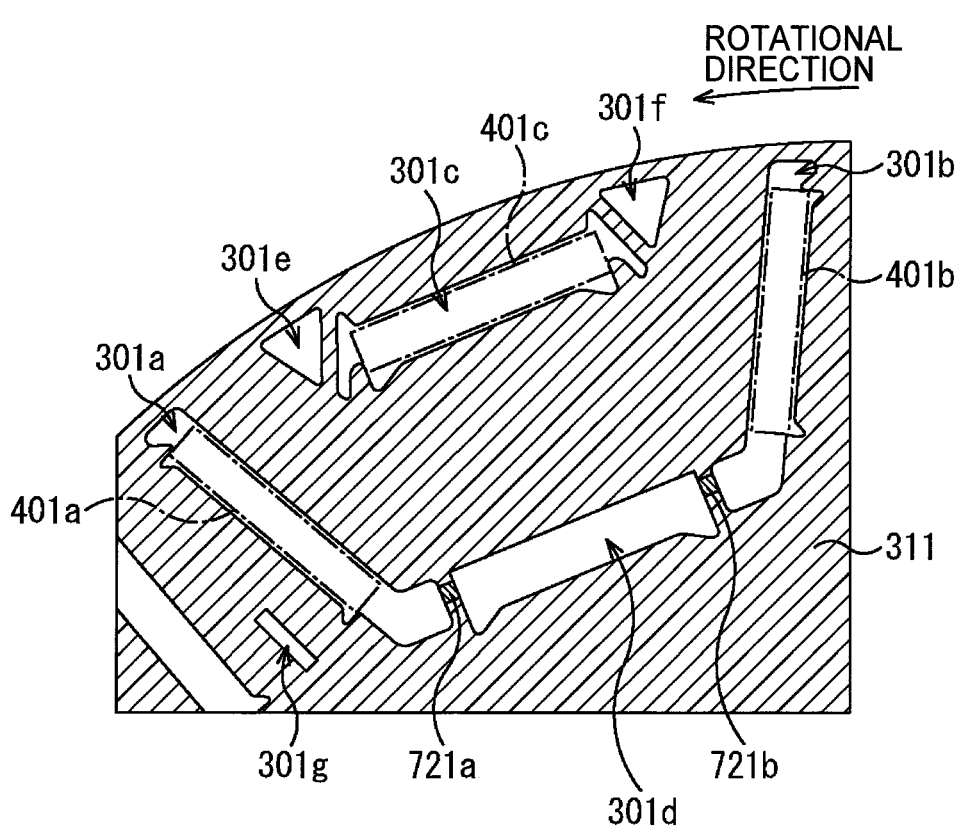
FIG. 7 is a view showing the configuration of comparative example 2 of a rotor core.
Figure 7:
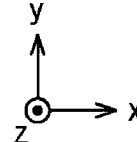
Figure 8:
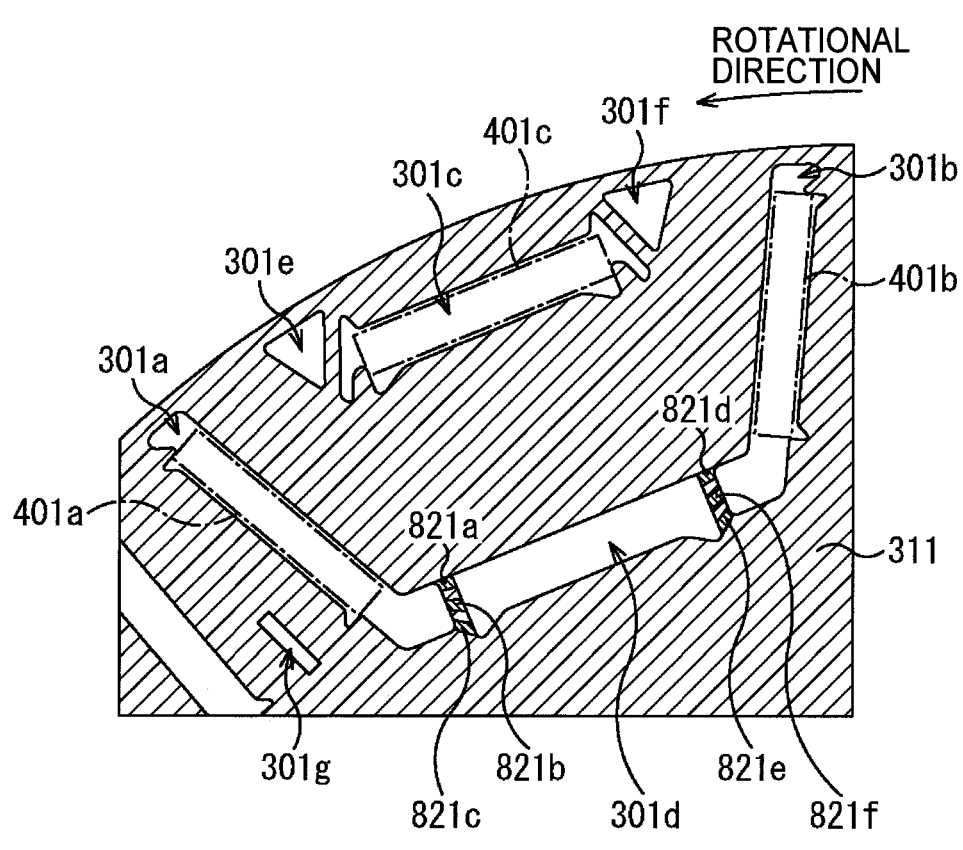
FIG. 8 is a view showing the configuration of comparative example 3 of a rotor core.
Figure 8:
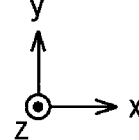

FIG. 6, FIG. 7, and FIG. 8 are views showing the configurations of comparative example 1, comparative example 2, and comparative example 3 of rotor cores. FIG. 6 to FIG. 8 are views corresponding to FIG. 4.

As shown in FIG. 6, comparative example 1 is a configuration where the low permeability portions 321a to 321b in example 1 are changed to the high permeability portion 311 (i.e., a configuration that does not have the low permeability portions 321a to 321b), while the rest is the same as in example 1. In comparative example 1, the value, expressed as a percentage, of the ratio of the area of the low permeability portions in the inner peripheral bridge portions 501a to 501b to the area of the inner peripheral bridge portions 501a to 501b in the rotor core cross-section is 0%.

As shown in FIG. 7, comparative example 2 is a configuration where the low permeability portions 321a to 321b in example 1 are changed to low permeability portions 721a to 721b, while the rest is the same as in example 1. In comparative example 2, parts of the inner peripheral bridge portions 501a to 501b are configured to serve as the low permeability portions 721a to 721b. In comparative example 2, the value, expressed as a percentage, of the ratio of the area of the low permeability portions 721a to 721b in the inner peripheral bridge portions 501a to 501b to the area of the inner peripheral bridge portions 501a to 501b in the rotor core cross-section is 40%.

As shown in FIG. 8, comparative example 3 is a configuration where the low permeability portions 321a to 321b in example 1 are changed to low permeability portions 821a to 821f, while the rest is the same as in example 1. In comparative example 3 also, as in comparative example 2, parts of the inner peripheral bridge portions 501a to 501b are configured to serve as the low permeability portions 821a to 821f. However, in comparative example 3, the value, expressed as a percentage, of the ratio of the area of the low permeability portions 821a to 821f in the inner peripheral bridge portions 501a to 501b to the area of the inner peripheral bridge portions 501a to 501b in the rotor core cross-section is 60%.

The high permeability portion 311 in example 1, comparative example 1, comparative example 2, and comparative example 3 has the same magnetization characteristics. Furthermore, the low permeability portions 321a to 321b, 721a to 721b, 821a to 821f in example 1, comparative example 2, and comparative example 3 differ only in the ratios of the areas they occupy in the inner peripheral bridge portions 501a to 501b, and have the same magnetization characteristics. Here, when evaluating the torques of the IPMSMs using an electromagnetic field analysis, samples obtained by pressing electromagnetic steel sheets of the same type as the high permeability portion 311 to a plate thickness half the plate thickness of those electromagnetic steel sheets were manufactured, the magnetization characteristics of the samples were measured, and the measured magnetization characteristics were taken as the magnetization characteristics of the low permeability portions 321a to 321b, 721a to 721b, 821a to 821f. It will be noted that the magnetization characteristics of the high permeability portion 311 are the magnetization characteristics of the electromagnetic steel sheets configuring the high permeability portion 311.

An electromagnetic field analysis of the IPMSMs when the IPMSMs equipped with the rotor cores of example 1, comparative example 1, comparative example 2, and comparative example 3 were operated under the operating conditions of a 3,000 rpm rotational speed, an excitation current (excitation current effective value) of 20 A, and an advance angle of 30 deg was executed by the finite element method using the magnetization characteristics of the high permeability portion 311 and the magnetization characteristics of the low permeability portions 321*a* to 321*b*, 721*a* to 721*b*, 821*a* to 821*f*. Here, a two-dimensional electromagnetic field analysis on the x-y plane was performed. Then, the Maxwell stress tensors were calculated based on the magnetic flux density vectors obtained as a result of the electromagnetic field analysis, and the torques of the IPMSMs were calculated from the Maxwell stress tensors.

As a result, in comparative example 1 shown in FIG. 6 the torque T of the IPMSM was 15.00 Nm; in comparative example 2 shown in FIG. 7 the torque of the IPMSM was 15.08 Nm; in comparative example 3 shown in FIG. 8 the torque T of the IPMSM was 15.10 Nm; and in example 1 shown in FIG. 4 the torque T of the IPMSM was 15.14 Nm. Consequently, the greater the ratio of the area of the low permeability portions to the area of the inner peripheral bridge portions 501*a* to 501*b* is in the order of 321*a* to 321*b*, 721*a* to 721*b*, 821*a* to 821*f*, the greater the torque of the IPMSM becomes. Compared to comparative example 1 shown in FIG. 6, in example 1 shown in FIG. 4, the torque of the IPMSM torque increases by 1.0%. Furthermore, whereas the maximum magnetic flux density in the inner peripheral bridge portions 501*a* to 501*b* was 1.7 T in comparative example 1 shown in FIG. 6, it was 1.4 T in example 1 shown in FIG. 4. These results correspond to a greater reduction in the magnetic flux recirculating in the rotor core 111 via the inner peripheral bridge portions 501*a* to 501*b* the greater the ratio of the area of the low permeability portions to the area of the inner peripheral bridge portions 501*a* to 501*b* is in the order of 321*a* to 321*b*, 721*a* to 721*b*, 821*a* to 821*f*, and this contributes to an increase in the torque of the IPMSM 100.

As described above, in the present embodiment, the entireties of the inner peripheral bridge portions 501*a* to 501*b*, at least parts of which are disposed at the inner peripheral surface side of the rotor core 111 relative to at least one of the regions 401*a* to 401*c* where the permanent magnets 112*a* to 112*c* are installed, are configured to serve as the low permeability portions 321*a* to 321*b*. Consequently, the magnetic flux recirculating in the rotor core 111 via the inner peripheral bridge portions 501*a* to 501*b* can be reduced. Thus, the torque of the IPMSM 100 can be increased. Furthermore, the mechanical strength of the core can be increased more by manufacturing the low permeability portions than by manufacturing nonmagnetic portions (whose relative permeability is the same as the relative permeability of a vacuum (=1)) as air gaps. Consequently, even if the outer dimension of the rotor core 111 is the same, the rotor core 111 that can increase the torque of the IPMSM 100 and realize a high rotational speed, that is, can realize a high output, can be manufactured.

In the present embodiment, an inner rotor type of IPMSM 100 is described as an example of the rotating electrical machine. However, the rotating electrical machine is not limited to an inner rotor type of IPMSM 100. For example, the low permeability portions may be manufactured as described in the present embodiment in a rotor of a motor of an outer rotor type of IPMSM. In this case, the inner peripheral surface of the rotor core becomes the end surface that opposes the stator across a gap, and the outer peripheral surface of the rotor core becomes the end surface on the opposite side of the end surface that opposes the stator across a gap. Consequently, in the case of manufacturing the low permeability portions as described in the present embodiment in a rotor of a motor of an outer rotor type of IPMSM, for example, one need only replace "inner rotor" with "outer rotor", replace "outer periphery" with "inner periphery", and replace "inner periphery" with "outer periphery" in the description of the present embodiment. The low permeability portions may also be manufactured as described in the present embodiment in a rotor of a permanent magnet embedded type of generator rather than in a permanent magnet embedded type of motor as the rotating electrical machine.

Second Embodiment

Next, a second embodiment will be described. In the first embodiment, a case where the entireties of the inner peripheral bridge portions 501*a* to 501*b* were configured to serve as the low permeability portions 321*a* to 321*b* was described as an example. In the present embodiment, a case where bridge portions apart from the inner peripheral bridge portions 501*a* to 501*b* are also configured to serve as low permeability portions will be described. In this way, the present embodiment is one where the number of portions configured to serve as low permeability portions is increased over that of the first embodiment. Consequently, in the description of the present embodiment, parts that are identical to those in the first embodiment are assigned reference signs that are identical to the reference signs in FIG. 1 to FIG. 8, and detailed description thereof will be omitted.

Figure 9:
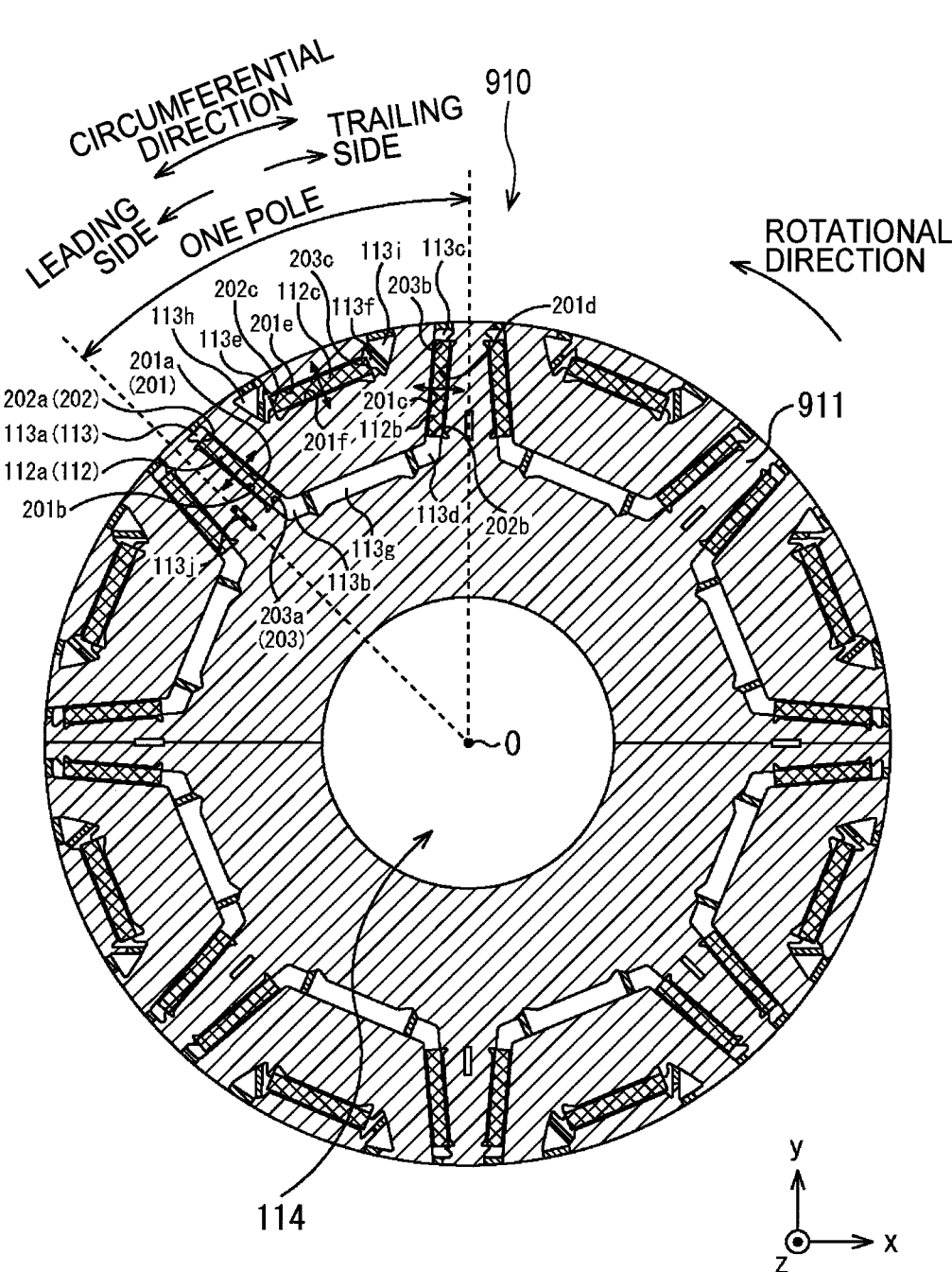
FIG. 9 is a view showing a second example of the configuration of a rotor.

In the present embodiment, the rotor 110 shown in FIG. 2 is changed as follows. FIG. 9 is a view showing an example of the configuration of a rotor 910. FIG. 9 is a sectional view of the rotor 910 (a view showing a rotor cross-section) as cut perpendicular to a centerline 0 of the rotor 910 and corresponds to FIG. 2. In the present embodiment also, as in the first embodiment, a case where the rotor 910 rotates in the direction of the arrowed line shown in FIG. 9 (the counterclockwise direction as one faces the page) and where the rotor 910 does not rotate in the opposite direction (the clockwise direction as one faces the page) of the direction of the arrowed line shown in FIG. 9 is described as an example.

The rotor 910 includes a rotor core 911 and plural permanent magnets 112 (three permanent magnets 112*a* to 112*c* per pole). The rotor core 911 is, for example, configured by stacking plural electromagnetic steel sheets along the centerline 0 of the rotor 910. However, it is not always necessary for the rotor core 911 to be configured by stacking plural electromagnetic steel sheets. As described as an example in the first embodiment, the rotor core 911 may also be configured by other soft magnetic materials.

The holes manufactured in the rotor core 911 are the same as the holes manufactured in the rotor core 111 of the first embodiment. Furthermore, the plural permanent magnets 112 are also the same as the plural permanent magnets 112 of the first embodiment. Consequently, in the rotor 910 of the present embodiment also, the same flux barriers 113 (113*a* to 113*j*) and hole 114 as those in the rotor 110 of the first embodiment are manufactured.

Furthermore, in the present embodiment also, as in the first embodiment, a case where the shape of the rotor cross-section has the shape shown in FIG. 9 in any position in the z-axis direction of the rotor 910 is described as an example. Furthermore, FIG. 9 shows as an example a case where, as in the first embodiment, the number of poles that the IPMSM has is eight. In FIG. 9 also, as in FIG. 2, only a portion configuring one pole of the rotor 910 is assigned reference signs, and reference signs for portions configuring the other seven poles of the rotor 910 are omitted, because otherwise the notation would become complicated.

Figure 10:
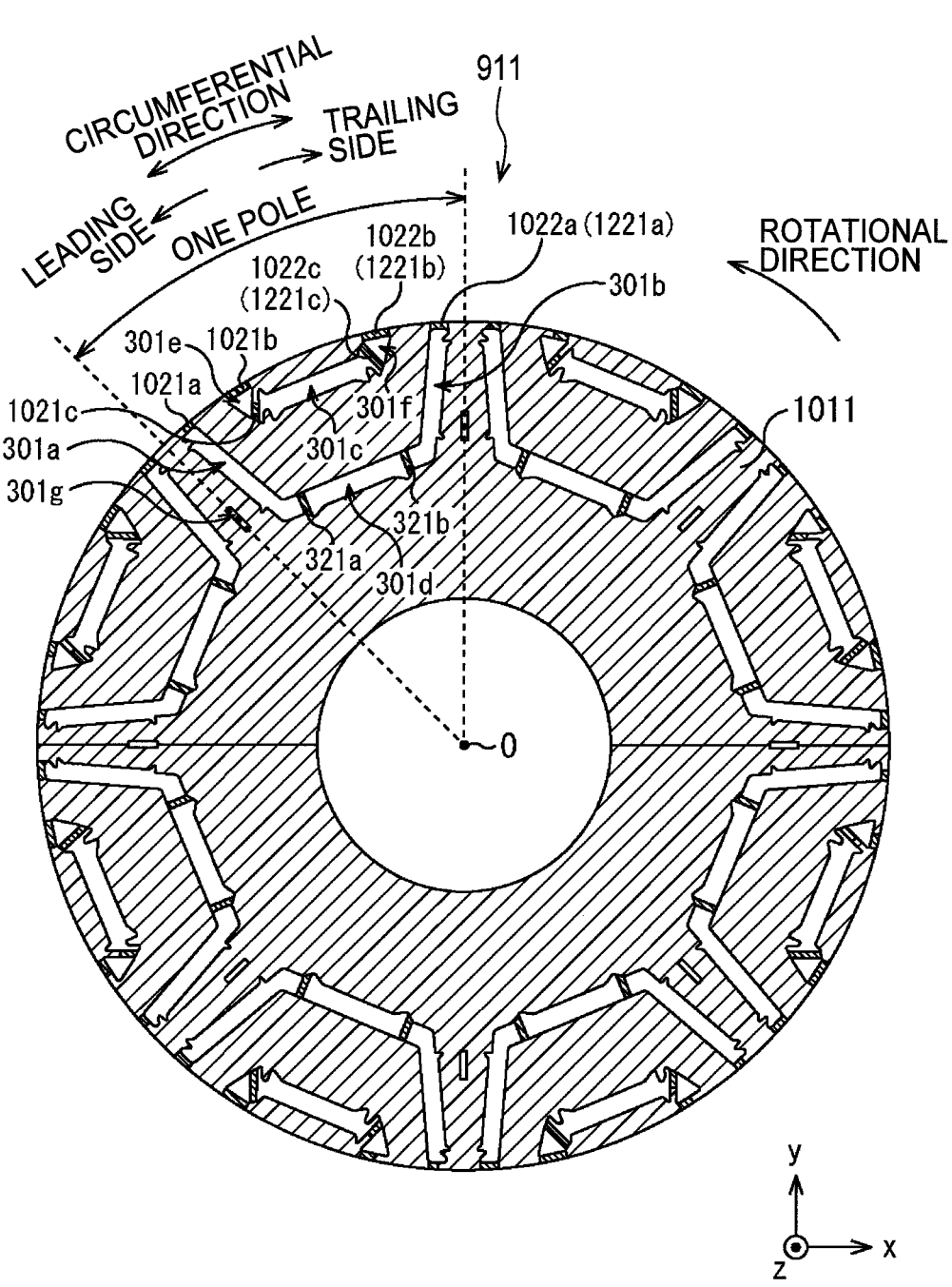
FIG. 10 is a view showing a second example of the configuration of a rotor core.
Figure 11:
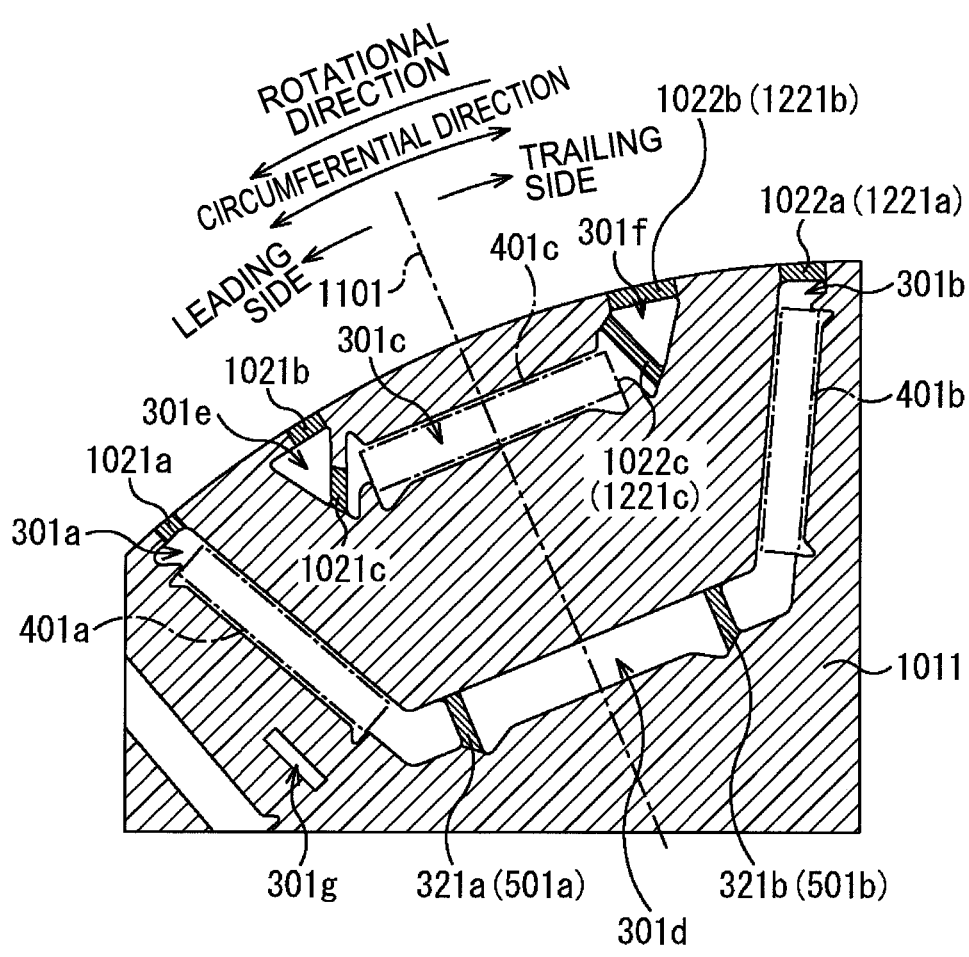
FIG. 11 is an enlarged view showing part of the rotor core shown in FIG. 10.
Figure 11:
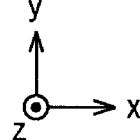

FIG. 10 is a view showing an example of the configuration of the rotor core 911. FIG. 10 is a sectional view of the rotor core 911 (i.e., a view showing a rotor core cross-section) as cut perpendicular to a centerline 0 of the rotor core 911 and corresponds to FIG. 3. It will be noted that in FIG. 10 also, as in FIG. 3, only a portion configuring one pole of the rotor core 911 is assigned reference signs, and reference signs for portions configuring the other seven poles of the rotor core 911 are omitted. FIG. 11 is an enlarged view showing part of the rotor core 911 shown in FIG. 10 and corresponds to FIG. 4.

In FIG. 10 and FIG. 11, the rotor core 911 is a rotor core where parts of the high permeability portion 311 are configured to serve as low permeability portions 1021*a* to 1021*c*, 1022*a* to 1022*c* with respect to the rotor core 111 of the first embodiment. The relative permeability of the low permeability portions 321*a* to 321*b*, 1021*a* to 1021*c*, 1022*a* to 1022*c* is smaller than the relative permeability of a high permeability portion 1011 and greater than the relative permeability of a vacuum (=1) (the relative permeability of a vacuum < the relative permeability of the low permeability portions 321*a* to 321*b*, 1021*a* to 1021*c*, 1022*a* to 1022*c* < the relative permeability of the high permeability portion 1011).

The low permeability portions 1021*a* to 1021*c*, 1022*a* to 1022*c* are, for example, manufactured using one of the methods of manufacturing the low permeability portions 321*a* to 321*b* described in the first embodiment. It will be noted that, from the standpoint of reducing the workload, it is preferred that the low permeability portions 321*a* to 321*b* and the low permeability portions 1021*a* to 1021*c*, 1022*a* to 1022*c* be manufactured by the same method. For example, by pressing the regions configuring the low permeability portions 321*a* to 321*b*, 1021*a* to 1021*c*, 1022*a* to 1022*c* among the region of the soft magnetic material (e.g., electromagnetic steel sheets) configuring the rotor core 911 to manufacture the low permeability portions 321*a* to 321*b*, 1021*a* to 1021*c*, 1022*a* to 1022*c*, the regions of the low permeability portions 321*a* to 321*b*, 1021*a* to 1021*c*, 1022*a* to 1022*c* in a single electromagnetic steel sheet can be manufactured by a one-time pressing.

The low permeability portions 1021*a* to 1021*c*, 1022*a* to 1022*c* are manufactured in parts of first outer peripheral bridge portions or parts of second outer peripheral bridge portions, which are bridge portions disposed at the outer peripheral side of the rotor core 911 relative to the inner peripheral bridge portions 501*a* to 501*b* described in the first embodiment. The first outer peripheral bridge portions are disposed at a region configuring one pole of the rotor core 911 and at the leading side in the rotational direction of the rotor core 911 relative to a circumferential direction center of the region. By contrast, the second outer peripheral bridge portions are disposed at a region configuring one pole of the rotor core 911 and at the trailing side in the rotational direction of the rotor core 911 relative to a circumferential direction center of the region.

Figure 12:
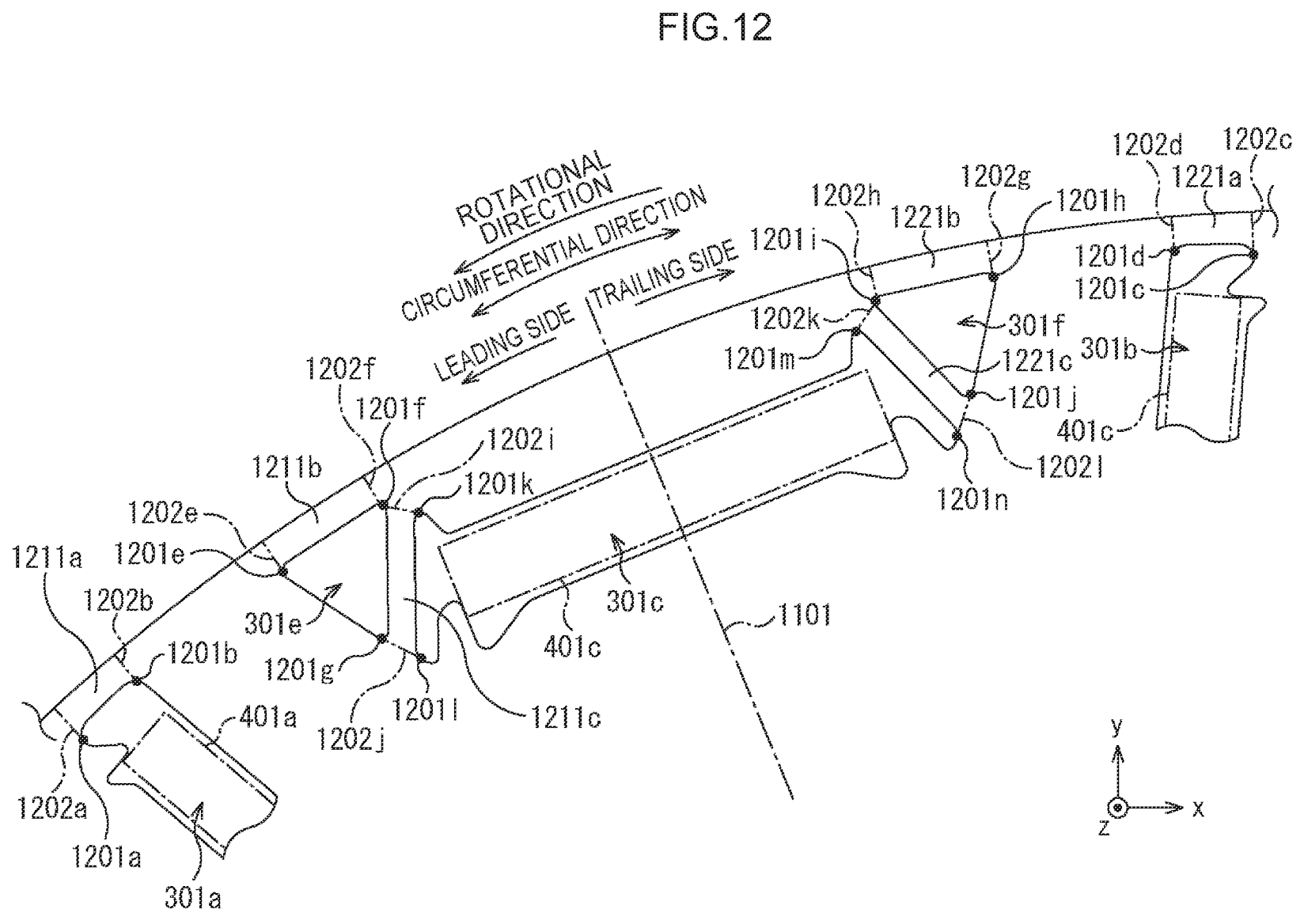

In the example shown in FIG. 10 and FIG. 11, the low permeability portions 1021*a* to 1021*c* are manufactured in parts of the first outer peripheral bridge portions. By contrast, the low permeability portions 1022*a* to 1022*c* are manufactured in the entireties of the second outer peripheral bridge portions. FIG. 12 is a view showing an example of first outer peripheral bridge portions 1211*a* to 1211*c* and second outer peripheral bridge portions 1221*a* to 1221*c*. It will be noted that in FIG. 12 illustration of the low permeability portions 1021*a* to 1021*c*, 1022*a* to 1022*c* is omitted because otherwise the notation would become complicated.

In FIG. 10 to FIG. 12, the first outer peripheral bridge portions 1211*a* to 1211*c* and the second outer peripheral bridge portions 1221*a* to 1221*c* are bridge portions where at least parts of the plural holes 301*a* to 301*g* manufactured in the rotor core 911 are disposed at the outer peripheral surface side of the rotor core 911 relative to the inner peripheral bridge portions 501*a* to 501*b*. The first outer peripheral bridge portions and the second outer peripheral bridge portions include bridge portions that are sandwiched between two holes to thereby be disposed between the two holes or bridge portions that are sandwiched between one hole and the outer peripheral surface of the rotor core to thereby be disposed between the hole and the outer peripheral surface of the rotor core.

Specifically, the first outer peripheral bridge portion 1211*a* is a bridge portion disposed between the hole 301*a* manufactured in the rotor core 911 and the outer peripheral surface of the rotor core 911. Furthermore, the second outer peripheral bridge portion 1221*a* is a bridge portion disposed between the hole 301*b* manufactured in the rotor core 911 and the outer peripheral surface of the rotor core 911.

As mentioned above, in FIG. 12, the first outer peripheral bridge portion 1211*a* (the entire region of the first outer peripheral bridge portion 1211*a*) is disposed at a region configuring one pole of the rotor core 911 and at the leading side in the rotational direction of the rotor core 911 relative to the circumferential direction center of the region. The second outer peripheral bridge portion 1221*a* (the entire region of the second outer peripheral bridge portion 1221*a*) is disposed at a region configuring one pole of the rotor core 911 and at the trailing side in the rotational direction of the rotor core 911 relative to the circumferential direction center of the region. The leading side in the rotational direction of the rotor core 911 is the opposite side of the trailing side in the rotational direction of the rotor core 911. Hereinafter, the leading side in the rotational direction of the rotor core 911 will also simply be called the leading side, and the trailing side in the rotational direction of the rotor core 911 will also simply be called the trailing side.

In the example shown in FIG. 9, the region configuring one pole of the rotor core 911 is the range of the double-arrowed line indicated as "one pole." In FIG. 11 and FIG. 12, a virtual line 1101 interconnects the centerline 0 and the position of a circumferential direction center of the region configuring one pole of the rotor core 911. The position indicated by the virtual line 1101 is the position of the circumferential direction center of the region configuring one pole of the rotor core 911. The first outer peripheral bridge portion 1211*a* (the entire region of the first outer peripheral bridge portion 1211*a*) is disposed at the leading side of the virtual line 1101, and the second outer peripheral bridge portion 1221*a* (the entire region of the second outer peripheral bridge portion 1221*a*) is disposed at the trailing side of the virtual line 1101.

The leading side in the rotational direction of the rotor core 911 is the leading position side of the permanent magnets 112 when viewed facing the rotational direction of the rotor 910, and the trailing side in the rotational direction of the rotor core 911 is the trailing position side of the permanent magnets 112. Specifically, in the example shown in FIG. 9, when viewed facing the rotational direction of the rotor 910, the leading positions of the permanent magnets 112 are on the side surfaces 202 of the permanent magnets 112, and the trailing positions of the permanent magnets 112 are on the side surfaces 203 of the permanent magnets 112. Consequently, the rotor core 911 is disposed at the rotor 910 so that the leading side in the rotational direction of the rotor core 911 becomes the side surface 202 sides of the permanent magnets 112 and the trailing side in the rotational direction of the rotor core 911 becomes the side surface 203 sides of the permanent magnets 112.

Furthermore, at least part of the first outer peripheral bridge portion 1211*a* is disposed at the outer peripheral surface side of the rotor core 911 relative to at least one of the regions 401*a* to 401*c* where the permanent magnets 112*a* to 112*c* shown in FIG. 11 are installed. Likewise, at least part of the second outer peripheral bridge portion 1221*a* is disposed at the outer peripheral surface side of the rotor core 911 relative to at least one of the regions 401*a* to 401*c* where the permanent magnets 112*a* to 112*c* shown in FIG. 11 are installed. In the present embodiment also, an inner rotor type of IPMSM is described as an example.

Consequently, in the present embodiment also, as in the first embodiment, a case where the outer peripheral surface of the rotor 910 (the rotor core 911) is the end surface of the rotor core 911 that opposes the stator 120 across a gap is described as an example.

FIG. 12 shows as an example a case where the entireties of the first outer peripheral bridge portion 1211*a* and the second outer peripheral bridge portion 1221*a* are disposed at the outer peripheral surface side of the rotor 910 (the rotor core 911) relative to the regions 401*a* to 401*c* where the three permanent magnets 112*a* to 112*c* are installed (it will be noted that as shown in FIG. 11 the region 401*c* where the permanent magnet 112*c* is installed is disposed at the outer peripheral surface side of the rotor 910 (the rotor core 911) relative to the regions 401*a* to 401*c* where the permanent magnets 112*a* to 112*c* are installed). More specifically, FIG. 12 shows as an example a case where the first outer peripheral bridge portion 1211*a* and the second outer peripheral bridge portion 1221*a* are disposed between the holes 301*a*, 301*b* and the outer peripheral surface of the rotor 910 (the rotor core 911).

Using FIG. 12, the region of the first outer peripheral bridge portion 1211*a* will be more specifically described. The first outer peripheral bridge portion 1211*a* is a region which is defined by two perpendicular lines drawn from representative points of the two corner portions of the hole 301*a* adjacent to the first outer peripheral bridge portion 1211*a* to the outer peripheral surface of the rotor core 911 (so as to be perpendicular to a tangent to the outer peripheral surface of the rotor core 911), the hole 301*a*, and the outer peripheral surface of the rotor core 911 in the rotor core cross-section and which is located between the hole 301*a* and the outer peripheral surface of the rotor core 911. The representative points of the two corner portions of the hole 301*a* are, for example, selected so that the perpendicular lines do not pass through the inside of the hole 301*a* and so that the size of the first outer peripheral bridge portion 1211*a* becomes the largest. It will be noted that in the rotor core cross-section the perpendicular lines drawn from the representative points of the corner portions to the outer peripheral surface of the rotor core 911 coincide with straight lines interconnecting the representative points of the corner portions and the centerline 0.

For example, in a case where a corner portion appears as one vertex in the rotor core cross-section, that vertex is selected as the representative point of the corner portion.

However, in a case where the corner portions are not defined by one vertex, such as a case where the corner portions of the hole 301*a* have a curvature to them, the representative points of the corner portions of the hole 301*a* are configured to serve as the corner portions from among the regions forming the corner portions of the hole 301*a*, such as the regions that have a curvature to them. The representative points of the corner portions are, for example, selected so that the size of the first outer peripheral bridge portion 1211*a* is the largest. However, it is not always necessary for the representative points of the corner portions to be selected in this way. For example, the center positions of the regions forming the corner portions may also be selected as the representative points.

In the example shown in FIG. 12, among the corner portions of the hole 301*a*, the two corner portions located in positions opposing the outer peripheral surface of the rotor core 911 each have a curvature to them, so points 1201*a* to 1201*b* are selected from the regions forming the corner portions of the hole 301*a* to be the representative points of the corner portions of the hole 301*a*. Additionally, the region which is defined by a perpendicular line 1202*a* drawn from the hole 301*a* representative point 1201*a* to the outer peripheral surface of the rotor core 911, a perpendicular line 1202*b* drawn from the hole 301*a* representative point 1201*b* to the outer peripheral surface of the rotor core 911, the hole 301*a*, and the outer peripheral surface of the rotor core 911 and which is located between the hole 301*a* and the outer peripheral surface of the rotor core 911 is the first outer peripheral bridge portion 1211*a*.

Likewise, representative points 1202*c* to 1202*d* of the corner portions of the hole 301*b* are selected. Additionally, the region which is defined by a perpendicular line 1202*c* drawn from the representative point 1201*c* of the hole 301*b* to the outer peripheral surface of the rotor core 911, a perpendicular line 1202*d* drawn from the representative point 1201*d* of the hole 301*b* to the outer peripheral surface of the rotor core 911, the hole 301*b*, and the outer peripheral surface of the rotor core 911 and which is located between the hole 301 and the outer peripheral surface of the rotor core 911 is the second outer peripheral bridge portion 1221*a*.

In FIG. 12, the first outer peripheral bridge portion 1211*b* is a bridge portion disposed between the hole 301*e* manufactured in the rotor core 911 and the outer peripheral surface of the rotor core 911. The first outer peripheral bridge portion 1211*c* is a bridge portion disposed between the holes 301*c*, 301*e* manufactured in the rotor core 911. The second outer peripheral bridge portion 1221*b* is a bridge portion disposed between the hole 301*f* manufactured in the rotor core 911 and the outer peripheral surface of the rotor core 911. The second outer peripheral bridge portion 1221*c* is a bridge portion disposed between holes 301*c*, 301*f* manufactured in the rotor core 911.

Like the first outer peripheral bridge portion 1211*a*, the first outer peripheral bridge portions 1211*b* to 1211*c* (the entire regions of the first outer peripheral bridge portions 1211*b* to 1211*c*) are disposed at a region configuring one pole of the rotor core 911 and at the leading side of the circumferential direction center (in other words, the virtual line 1101) of the region. Like the second outer peripheral bridge portion 1221*a*, the second outer peripheral bridge portions 1221*b* to 1221*c* (the entire regions of the second outer peripheral bridge portions 1221*b* to 1221*c*) are disposed at the trailing side of the circumferential direction center (the virtual line 1101) of a region configuring one pole of the rotor core 911.

Furthermore, like the first outer peripheral bridge portion 1211*a*, at least parts of the first outer peripheral bridge portions 1211*b* to 1211*c* are disposed at the outer peripheral surface side of the rotor core 911 relative to at least one of the regions 401*a* to 401*c* where the permanent magnets 112*a* to 112*c* shown in FIG. 11 are installed. Furthermore, like the second outer peripheral bridge portion 1221*a*, at least parts of the second outer peripheral bridge portions 1221*b* to 1221*c* are disposed at the outer peripheral surface side of the rotor core 911 relative to at least one of the regions 401*a* to 401*c* where the permanent magnets 112*a* to 112*c* shown in FIG. 11 are installed.

FIG. 12 shows as an example a case where the entireties of the first outer peripheral bridge portion 1211*b* and the second outer peripheral bridge portion 1221*b* are disposed at the outer peripheral surface side of the rotor 910 (the rotor core 911) relative to the regions 401*a* to 401*c* where the permanent magnets 112*a* to 112*c* are installed. More specifically, FIG. 12 shows as an example a case where the first outer peripheral bridge portion 1211*b* and the second outer peripheral bridge portion 1221*b* are disposed between the holes 301*e*, 301*f* and the outer peripheral surface of the rotor 910 (the rotor core 911).

In this way, the first outer peripheral bridge portion 1211*b* and the second outer peripheral bridge portion 1221*b* are, like the first outer peripheral bridge portion 1211*a* and the second outer peripheral bridge portion 1221*a*, bridge portions located between the outer peripheral surface of the rotor 910 (the rotor core 911) and a hole, so they are defined in the same way as the first outer peripheral bridge portion 1211*a* and the second outer peripheral bridge portion 1221*a*.

Specifically, in the example shown in FIG. 12, representative points 1201*e* to 1201*f* of the corner portions of the hole 301*e* are selected. Additionally, the region which is defined by a perpendicular line 1202*e* drawn from the hole 301*e* representative point 1201*e* to the outer peripheral surface of the rotor core 911, a perpendicular line 1202*f* drawn from the hole 301*e* representative point 1201*f* to the outer peripheral surface of the rotor core 911, the hole 301*e*, and the outer peripheral surface of the rotor core 911 and which is located between the hole 301*e* and the outer peripheral surface of the rotor core 911 is the first outer peripheral bridge portion 1211*b*.

Likewise, representative points 1201*h* to 1201*i* of the corner portions of the hole 301*f* are selected. Additionally, the region which is defined by a perpendicular line 1202*g* drawn from the representative point 1201*h* of the hole 301*f* to the outer peripheral surface of the rotor core 911, a perpendicular line 1202*h* drawn from the representative point 1201*i* of the hole 301*f* to the outer peripheral surface of the rotor core 911, the hole 301*f*, and the outer peripheral surface of the rotor core 911 and which is located between the hole 301*f* and the outer peripheral surface of the rotor core 911 is the second outer peripheral bridge portion 1221*b*.

Furthermore, FIG. 12 shows as an example a case where the first outer peripheral bridge portion 1211*c* is disposed between the hole 301*c* and the hole 301*e* and where the second outer peripheral bridge portion 1221*c* is disposed between the hole 301*c* and the hole 301*f*. At least parts of the first outer peripheral bridge portion 1211*c* and the second outer peripheral bridge portion 1221*c* are disposed at the outer peripheral surface side of the rotor 910 (the rotor core 911) relative to at least one of the regions 401*a* to 401*c* where the permanent magnets 112*a* to 112*c* are installed. FIG. 12 shows as an example a case where parts of the first outer peripheral bridge portion 1211*c* and the second outer peripheral bridge portion 1221*c* are disposed at the outer peripheral surface side of the rotor 910 (the rotor core 911) relative to the region 401*c* where the permanent magnet 112*c* is installed.

In this way, the first outer peripheral bridge portion 1211*c* and the second outer peripheral bridge portion 1221*c* are, like the inner peripheral bridge portions 501*a* to 501*b* of the first embodiment, bridge portions located between two holes, so they are defined in the same way as the inner peripheral bridge portions 501*a* to 501*b* of the first embodiment.

Specifically, in the example shown in FIG. 12, representative points 1201*f* to 1201*g* of the corner portions of the hole 301*e* are selected, and representative points 1201*k* to 12011 of the corner portions of the hole 301*c* are selected. Additionally, the region which is defined by a straight line 1202*i* interconnecting the representative point 1201*f* of the corner portion of the hole 301*e* and the representative point 1201*k* of the corner portion of the hole 301*c*, a straight line 1202*j* interconnecting the representative point 1201*g* of the corner portion of the hole 301*e* and the representative point 12011 of the corner portion of the hole 301*c*, and the holes 301*c*, 301*e* and which is located between the holes 301*c*, 301*e* is the first outer peripheral bridge portion 1211*c*.

Likewise, representative points 1201*i* to 1201*j* of the corner portions of the hole 301*f* are selected, and representative points 1201*m* to 1201*n* of the corner portions of the hole 301*c* are selected. Additionally, the region which is defined by a straight line 1202*k* interconnecting the representative point 1201*i* of the corner portion of the hole 301*f* and the representative point 1201*m* of the corner portion of the hole 301*c*, a straight line 12021 interconnecting the representative point 1201*j* of the corner portion of the hole 301*f* and the representative point 1201*n* of the corner portion of the hole 301*c*, and the holes 301*c*, 301*f* and which is located between the holes 301*c*, 301*f* is the second outer peripheral bridge portion 1221*c*.

In the present embodiment, the first outer peripheral bridge portions 1211*a* to 1211*c* and the second outer peripheral bridge portions 1221*a* to 1221*c* are defined as described above.

As mentioned above, parts of the first outer peripheral bridge portions 1211*a* to 1211*c* are the low permeability portions 1021*a* to 1021*c*, so parts of the first outer peripheral bridge portions 1211*a* to 1211*c* shown in FIG. 12 serve as the low permeability portions 1021*a* to 1021*c*, while the rest of the first outer peripheral bridge portions 1211*a* to 1211*c* are the high permeability portion 1011. By contrast, the entireties of the second outer peripheral bridge portions 1221*a* to 1221*c* are the low permeability portions 1022*a* to 1022*c*, so the second outer peripheral bridge portions 1221*a* to 1221*c* shown in FIG. 12 and the low permeability portions 1022*a* to 1022*c* shown in FIG. 10 and FIG. 11 are coincident with each other. This is what is meant by the reference signs "1021*a* (1221*a*)", "1021*b* (1221*b*)", "1021*c* (1221*c*)" in FIG. 11. It will be noted that in FIG. 11 also, as in FIG. 4, the reference signs "321*a* (501*a*)", "321*b* (501*b*)" indicate that the inner peripheral bridge portions 501*a* to 501*b* and the low permeability portions 321*a* to 321*b* are coincident with each other.

The present inventors found that by configuring parts of the first outer peripheral bridge portions 1211*a* to 1211*c* disposed at the leading side of the circumferential direction center of the region configuring one pole of the rotor 911 to serve as the low permeability portions 1021*a* to 1021*c*, the torque of the rotating electrical machine increases more than in a case where the entireties of the first outer peripheral bridge portions 1211a to 1211c are configured to serve as the low permeability portions. This will be described below.

Figure 13:
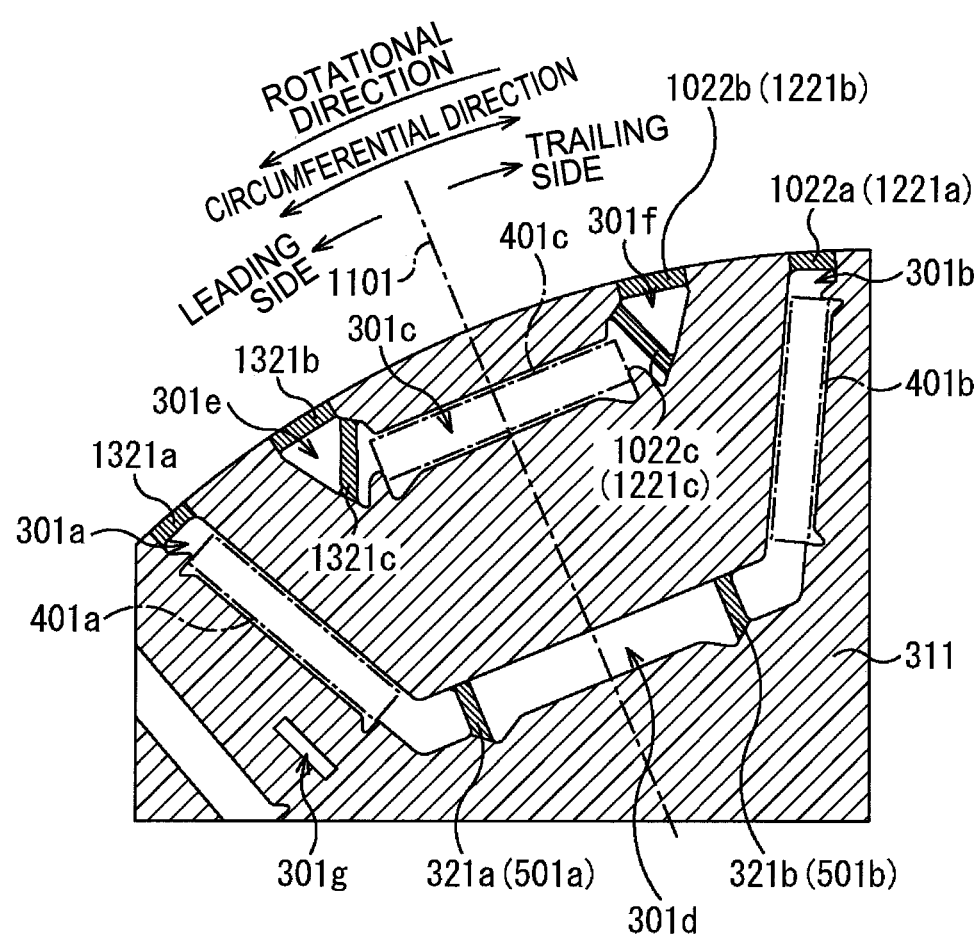
FIG. 13 is a view showing the configuration of comparative example 4 of a rotor core.
Figure 13:
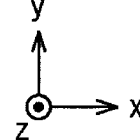

FIG. 13 is a view showing the configuration of comparative example 4 of a rotor core. FIG. 13 is a view corresponding to FIG. 11. Here, a configuration where, as shown in FIG. 10 and FIG. 11, parts of the first outer peripheral bridge portions 1211a to 1211c are configured to serve as the low permeability portions 1021a to 1021c will be called example 2 of the present disclosure. It will be noted that here, for comparison with example 2, the rotor core shown in FIG. 13 will be called comparative example 4, but comparative example 4 also, as aforementioned example 1 shown in FIG. 3 and FIG. 4, can also be called an example of the disclosure because the entireties of the inner peripheral bridge portions 501a to 501b are configured to serve as the low permeability portions 321a to 321b.

As shown in FIG. 13, comparative example 4 is a configuration where the low permeability portions 1021a to 1021c in example 2 are changed to low permeability portions 1321a to 1321c (i.e., a configuration where the entireties of the first outer peripheral bridge portions 1211a to 1211c are configured to serve as low permeability portions), while the rest is the same as in example 2. Consequently, in comparative example 4, the value, expressed as a percentage, of the ratio of the area of the low permeability portions in the first outer peripheral bridge portions 1211a to 1211c to the area of the first outer peripheral bridge portions 1211a to 1211c in the rotor core cross-section is 100%. By contrast, in example 2, the value, expressed as a percentage, of the ratio of the area of the low permeability portions in the first outer peripheral bridge portions 1211a to 1211c to the area of the first outer peripheral bridge portions 1211a to 1211c in the rotor core cross-section is 50%. It will be noted that the value, expressed as a percentage, of the ratio of the area of the low permeability portions in the first outer peripheral bridge portions 1211a to 1211c to the area of the first outer peripheral bridge portions 1211a to 1211c in the rotor core cross-section is preferably greater than 0% and equal to or less than 90% and more preferably greater than 40% and equal to or less than 60%. Furthermore, the number of the low permeability portions manufactured in one of the first outer peripheral bridge portions 1211a to 1211c may be one or more than one.

The low permeability portions 1021a to 1021c, 1321a to 1321c in example 2 and comparative example 4 differ only in the ratios of the areas they occupy in the first outer peripheral bridge portions 1211a to 1211c, and have the same magnetization characteristics. Here, when evaluating the torques of the IPMSMs using an electromagnetic field analysis, samples obtained by pressing electromagnetic steel sheets of the same type as the high permeability portion 1011 to a plate thickness half the plate thickness of those electromagnetic steel sheets were manufactured, the magnetization characteristics of the samples were measured, and the measured magnetization characteristics were taken as the magnetization characteristics of the low permeability portions 1021a to 1021c, 1321a to 1321c. It will be noted that the magnetization characteristics of the high permeability portion 1011 are the magnetization characteristics of the electromagnetic steel sheets configuring the high permeability portion 1011.

An electromagnetic field analysis of the IPMSMs when the IPMSMs equipped with the rotor cores of example 2 and comparative example 4 were operated under the operating conditions of a 3,000 rpm rotational speed, an excitation current (excitation current effective value) of 20 A, and an advance angle of 30 deg was executed by the finite element method using the magnetization characteristics of the high permeability portion 1011 and the magnetization characteristics of the low permeability portions 1021a to 1021c, 1321a to 1321c. Here, a two-dimensional electromagnetic field analysis on the x-y plane was performed. Then, the Maxwell stress tensors were calculated based on the magnetic flux density vectors obtained as a result of the electromagnetic field analysis, and the torques of the IPMSMs were calculated from the Maxwell stress tensors.

As a result, whereas in comparative example 4 shown in FIG. 13 the torque T of the IPMSM was 15.75 Nm, in example 2 shown in FIG. 11 the torque of the IPMSM was 15.76 Nm. Consequently, the torque T of the IPMSM increases more when parts of the first outer peripheral bridge portions 1211a to 1211c are configured to serve as the low permeability portions 1021a to 1021c than in a case where the entireties of the first outer peripheral bridge portions 1211a to 1211c are configured to serve as the low permeability portions 1321a to 1321c. In this example, the torque T of the IPMSM increases 0.1% in example 2 shown in FIG. 11 compared to comparative example 4 shown in FIG. 13.

As described above, in the present embodiment, parts of the first outer peripheral bridge portions 1211a to 1211c, at least parts of which are disposed at the outer peripheral surface side of the rotor core 911 relative to at least one of the regions 401a to 401c where the permanent magnets 112a to 112c are installed and which are disposed at a region configuring one pole of the rotor core 911 and at the leading side in the rotational direction relative to the circumferential direction center of the region, are configured to serve as the low permeability portions 1021a to 1021c. Consequently, the torque of the IPMSM 100 can be increased more.

Furthermore, in the present embodiment, the entireties of the second outer peripheral bridge portions 1221a to 1221c, at least parts of which are disposed at the outer peripheral surface side of the rotor core 911 relative to at least one of the regions 401a to 401c where the permanent magnets 112a to 112c are installed and which are disposed at a region configuring one pole of the rotor core 911 and at the trailing side in the rotational direction relative to the circumferential direction center of the region, are configured to serve as the low permeability portions 1022a to 1022c. Consequently, the torque of the IPMSM 100 can be increased even more.

In the present embodiment, as in the first embodiment, a case where the entireties of the inner peripheral bridge portions 501a to 501b are configured to serve as the low permeability portions 321a to 321b is described as an example. However, a configuration where the entireties of the inner peripheral bridge portions 501a to 501b are not configured to serve as the low permeability portions 321a to 321b may also be employed. That is, a rotor core that includes the low permeability portions 1021a to 1021c, 1022a to 1022c but does not include the low permeability portions 321a to 321b may also be employed.

Furthermore, it is preferred that parts of the first outer peripheral bridge portions 1211a to 1211c be configured to serve as the low permeability portions 1021a to 1021c, but the entireties of the first outer peripheral bridge portions 1211a to 1211c may also be configured to serve as low permeability portions. In a case where this is done, the entireties of all the bridge portions of the rotor core become low permeability portions. Furthermore, parts of the second outer peripheral bridge portions 1221a to 1221c may be configured to serve as low permeability portions.

Furthermore, the embodiments of the present disclosure described above are all merely illustrative of examples of instantiations when implementing the present disclosure, and the technical scope of the present disclosure should not be narrowly construed by them. That is, the present disclosure may be implemented in various ways without departing from the technical thought or the major features thereof.

In relation to the above embodiments, the following supplementary notes are further disclosed.

(Supplementary Note 1)

A rotor core having plural holes including holes in which permanent magnets are installed, the rotor core including:

a high permeability portion; and a low permeability portion whose relative permeability is smaller than the relative permeability of the high permeability portion and greater than the relative permeability of air, wherein the entirety of an inner peripheral bridge portion, at least part of a region of which is disposed at an inner peripheral surface side of the rotor core relative to at least one of regions where the permanent magnets are installed, is the low permeability portion.

(Supplementary Note 2)

The rotor core of claim supplementary note 1, wherein the rotor core has two or more inner peripheral bridge portions per pole, and the entireties of the two or more inner peripheral bridge portions are the low permeability portions.

(Supplementary Note 3)

The rotor core of supplementary note 1 or supplementary note 2, wherein the inner peripheral bridge portion is located between two of the holes in which the permanent magnets are installed.

(Supplementary Note 4)

The rotor core of any one of supplementary note 1 to supplementary note 3, wherein the plural holes further include holes in which permanent magnets are not installed, and the inner peripheral bridge portion is located at at least one of between a hole in which the permanent magnet is installed and a hole in which the permanent magnet is not installed or between two holes in which the permanent magnets are not installed.

(Supplementary Note 5)

The rotor core of any one of supplementary note 1 to supplementary note 4, wherein there is at least one of the inner peripheral bridge portion between end portions, on the inner peripheral surface side, of two holes disposed so that pole faces of the permanent magnets installed therein are inclined relative to an outer peripheral surface of the rotor core among the holes in which the permanent magnets are installed.

(Supplementary Note 6)

The rotor core of any one of supplementary note 1 to supplementary note 5, wherein part of a first outer peripheral bridge portion, which is disposed at a region configuring one pole of the rotor core and at a leading side in a rotational direction relative to a circumferential direction center of the region, and at least part of a region of which is disposed at an outer peripheral surface side of the rotor core relative to at least one of regions where the permanent magnets are installed, is the low permeability portion.

(Supplementary Note 7)

The rotor core of supplementary note 6, wherein the entirety of a second outer peripheral bridge portion, which is disposed at a region configuring one pole of the rotor core and at a trailing side in a rotational direction relative to a circumferential direction center of the region, and at least part of a region of which is disposed at an outer peripheral surface side of the rotor core relative to at least one of regions where the permanent magnets are installed, is the low permeability portion.

(Supplementary Note 8)

A rotor core having plural holes including holes in which permanent magnets are installed, the rotor core including:

a high permeability portion; and a low permeability portion whose relative permeability is smaller than the relative permeability of the high permeability portion and greater than the relative permeability of air, wherein part of a first outer peripheral bridge portion, which is disposed at a region configuring one pole of the rotor core and at a leading side in a rotational direction relative to a circumferential direction center of the region, and at least part of a region of which is disposed at an outer peripheral surface side of the rotor core relative to at least one of regions where the permanent magnets are installed, is the low permeability portion.

(Supplementary Note 9)

The rotor core of supplementary note 8, which is disposed at a region configuring one pole of the rotor core and at a trailing side in a rotational direction relative to a circumferential direction center of the region, and at least part of a region of which is disposed at an outer peripheral surface side of the rotor core relative to at least one of regions where the permanent magnets are installed.

(Supplementary Note 10)

The rotor core of any one of supplementary note 6 to supplementary note 9, wherein the first outer peripheral bridge portion is disposed at at least one of between the holes and the outer peripheral surface and between two of the holes including the holes at least parts of which are disposed at the outer peripheral surface side relative to at least one of regions where the permanent magnets are installed.

(Supplementary Note 11)

A rotor including:

the rotor core of any one of supplementary note 1 to supplementary note 10; and the permanent magnets.

(Supplementary Note 12)

A rotating electrical machine including:

the rotor of supplementary note 11; and a stator.

(Supplementary Note 13)

A rotor core having plural holes including holes in which permanent magnets are installed, the rotor core including:

a high permeability portion; and a low permeability portion having a relative permeability that is smaller than a relative permeability of the high permeability portion and that is greater than a relative permeability of a vacuum, wherein an entirety of an inner peripheral bridge portion, at least part of a region of which is disposed at an inner peripheral surface side of the rotor core relative to at least one of regions where the permanent magnets are installed, is the low permeability portion.

(Supplementary Note 14)

The rotor core of supplementary note 13, wherein the low permeability portion and the high permeability portion are integrally formed of the same material.

(Supplementary Note 15)

The rotor core of supplementary note 14, wherein:

the high permeability portion is a portion configured by a soft magnetic material, and the low permeability portion is a portion in which a permeability of the soft magnetic material has been lowered.

(Supplementary Note 16)

The rotor core of any one of supplementary note 13 to supplementary note 15, wherein:

the rotor core has two or more inner peripheral bridge portions per pole, and entireties of the two or more inner peripheral bridge portions are low permeability portions.

(Supplementary Note 17)

The rotor core of any one of supplementary note 13 to supplementary note 16, wherein the inner peripheral bridge portion is located between two of the holes in which the permanent magnets are installed.

(Supplementary Note 18)

The rotor core of any one of supplementary note 13 to supplementary note 17, wherein:

the plural holes further include holes in which permanent magnets are not installed, and the inner peripheral bridge portion is located at at least one of between a hole in which a permanent magnet is installed and a hole in which a permanent magnet is not installed or between two holes in which permanent magnets are not installed.

(Supplementary Note 19)

The rotor core of any one of supplementary note 13 to supplementary note 18, wherein there is at least one of the inner peripheral bridge portion between end portions, on the inner peripheral surface side, of two holes disposed so that magnetic pole faces of the permanent magnets installed therein are inclined relative to an outer peripheral surface of the rotor core, among the holes in which the permanent magnets are installed.

(Supplementary Note 20)

The rotor core of any one of supplementary note 13 to supplementary note 19, wherein part of a first outer peripheral bridge portion, which is disposed at a region configuring one pole of the rotor core and at a leading side in a rotational direction relative to a circumferential direction center of the region, and at least part of a region of which is disposed at an outer peripheral surface side of the rotor core relative to at least one of regions where the permanent magnets are installed, is the low permeability portion.

(Supplementary Note 21)

The rotor core of supplementary note 20, wherein an entirety of a second outer peripheral bridge portion, which is disposed at a region configuring one pole of the rotor core and at a trailing side in the rotational direction relative to a circumferential direction center of the region, and at least part of a region of which is disposed at the outer peripheral surface side of the rotor core relative to at least one of regions where the permanent magnets are installed, is the low permeability portion.

(Supplementary Note 22)

A rotor core having plural holes including holes in which permanent magnets are installed, the rotor core including:

a high permeability portion; and a low permeability portion having a relative permeability that is smaller than a relative permeability of the high permeability portion and that is greater than a relative permeability of a vacuum, wherein part of a first outer peripheral bridge portion, which is disposed at a region configuring one pole of the rotor core and at a leading side in a rotational direction relative to a circumferential direction center of the region, and at least part of a region of which is disposed at an outer peripheral surface side of the rotor core relative to at least one of regions where the permanent magnets are installed, is the low permeability portion.

(Supplementary Note 23)

The rotor core of supplementary note 22, wherein the low permeability portion and the high permeability portion are integrally formed of the same material.

(Supplementary Note 24)

The rotor core of supplementary note 23, wherein:

the high permeability portion is a portion configured by a soft magnetic material, and the low permeability portion is a portion in which a permeability of the soft magnetic material has been lowered.

(Supplementary Note 25)

The rotor core of any one of supplementary note 22 to supplementary note 24, wherein an entirety of a second outer peripheral bridge portion, which is disposed at a region configuring one pole of the rotor core and at a trailing side in a rotational direction relative to a circumferential direction center of the region, and at least part of a region of which is disposed at the outer peripheral surface side of the rotor core relative to at least one of regions where the permanent magnets are installed, is the low permeability portion.

(Supplementary Note 26)

The rotor core of any one of supplementary note 20 to supplementary note 25, wherein the first outer peripheral bridge portion is disposed at at least one of between the holes and the outer peripheral surface or between two of the holes including the holes at least parts of which are disposed at the outer peripheral surface side relative to at least one region of the regions where the permanent magnets are installed.

(Supplementary Note 27)

A rotor including:

the rotor core of any one of supplementary note 13 to supplementary note 26; and the permanent magnets.

(Supplementary Note 28)

A rotating electrical machine including:

the rotor of supplementary note 27; and a stator.

Furthermore, the disclosure of Japanese Patent Application No. 2021-060471 filed on Mar. 31, 2021, is incorporated in its entirety herein by reference.

All documents, patent applications, and technical standards mentioned in this specification are incorporated herein by reference to the same extent as if each individual document, patent application, or technical standard were specifically and individually indicated to be incorporated by reference.

The invention claimed is:

1. A rotor core having plural holes including holes in which permanent magnets are installed, the rotor core comprising:

a high permeability portion; and a low permeability portion having a relative permeability that is smaller than a relative permeability of the high permeability portion and that is greater than a relative permeability of a vacuum, wherein only a part of a first outer peripheral bridge portion, which is disposed at a region configuring one pole of the rotor core and at a leading side in a rotational direction relative to a circumferential direction center of the region, and at least part of a region of which is disposed at an outer peripheral surface side of the rotor core relative to at least one of regions where the permanent magnets are installed, is the low permeability portion, and an entirety of a second outer peripheral bridge portion, which is disposed at a region configuring one pole of the rotor core and at a trailing side in a rotational direction relative to a circumferential direction center of the region, and at least part of a region of which is disposed at the outer peripheral surface side of the rotor core relative to at least one of regions where the permanent magnets are installed, is the low permeability portion.

2. The rotor core of claim 1, wherein the low permeability portion and the high permeability portion are integrally formed of the same material.

3. The rotor core of claim 2, wherein:

the high permeability portion is a portion configured by a soft magnetic material, and the low permeability portion is a portion in which a permeability of the soft magnetic material has been lowered.

4. The rotor core of claim 1, wherein the first outer peripheral bridge portion is disposed at at least one of between the holes and the outer peripheral surface or between two of the holes including the holes at least parts of which are disposed at the outer peripheral surface side relative to at least one region of the regions where the permanent magnets are installed.

5. A rotor comprising:
the rotor core of claim 1; and
the permanent magnets.

6. The rotor core of claim 1, wherein an entirety of an inner peripheral bridge portion, at least part of a region of which is disposed at an inner peripheral surface side of the rotor core relative to at least one of regions where the permanent magnets are installed, is the low permeability portion.

7. The rotor core of claim 6, wherein:

the rotor core has two or more inner peripheral bridge portions per pole, and entireties of the two or more inner peripheral bridge portions are low permeability portions.

8. The rotor core of claim 6, wherein the inner peripheral bridge portion is located between two of the holes in which the permanent magnets are installed.

9. The rotor core of claim 6, wherein:

the plural holes further include holes in which permanent magnets are not installed, and the inner peripheral bridge portion is located at at least one of between a hole in which a permanent magnet is installed and a hole in which a permanent magnet is not installed or between two holes in which permanent magnets are not installed.

10. The rotor core of claim 6, wherein there is at least one inner peripheral bridge portion between end portions, on the inner peripheral surface side, of two holes disposed so that magnetic pole faces of the permanent magnets installed therein are inclined relative to an outer peripheral surface of the rotor core, among the holes in which the permanent magnets are installed.

* * * * *